United States Patent
Herdy, Jr.

(10) Patent No.: US 12,549,066 B2
(45) Date of Patent: Feb. 10, 2026

(54) REVERSE CONVECTION POWER GENERATION

(71) Applicant: CFD Research Corporation, Huntsville, AL (US)

(72) Inventor: Joseph Roger Herdy, Jr., Huntsville, AL (US)

(73) Assignee: CFD RESEARCH CORPORATION, Huntsville, AL (US)

(*) Notice: Subject to any disclaimer, the term of this patent is extended or adjusted under 35 U.S.C. 154(b) by 0 days.

(21) Appl. No.: 18/415,319

(22) Filed: Jan. 17, 2024

(65) Prior Publication Data
US 2024/0243640 A1    Jul. 18, 2024

Related U.S. Application Data

(60) Provisional application No. 63/480,427, filed on Jan. 18, 2023.

(51) Int. Cl.
H02K 7/18        (2006.01)

(52) U.S. Cl.
CPC ................... H02K 7/1823 (2013.01)

(58) Field of Classification Search
CPC ........... H02K 7/1823; F03G 7/05; F03G 7/06; F03G 7/00; F03G 7/04; F03G 7/045; F03G 7/047; F03G 7/003; F01D 15/00; F01D 15/02; F01D 15/10; Y02E 10/00; Y02E 10/20; Y02E 10/40; Y02E 10/44; F03B 13/10

See application file for complete search history.

(56) References Cited

U.S. PATENT DOCUMENTS

| | | | |
|---|---|---|---|
| 6,187,700 B1* | 2/2001 | Merkel | C04B 35/495 501/32 |
| 11,332,599 B2* | 5/2022 | Fukazawa | C09C 3/063 |
| 12,162,649 B2* | 12/2024 | Laurence | B65D 39/12 |
| 2011/0306467 A1* | 12/2011 | Massa | H02K 41/031 318/135 |
| 2017/0241942 A1* | 8/2017 | Chung | G01N 27/4077 |
| 2018/0251376 A1* | 9/2018 | Fukazawa | C01B 25/45 |
| 2018/0265358 A1* | 9/2018 | Fukazawa | B01J 2/06 |
| 2018/0315988 A1* | 11/2018 | Fan | H01M 10/4235 |

(Continued)

OTHER PUBLICATIONS

Wikipedia, The Free Online Encyclopedia; "Negative Thermal Expansion"; Encyclopedia; Jan. 4, 2024; located online at: https://en.wikipedia.org/wiki/Negative_thermal_expansion; 6 pages.

(Continued)

*Primary Examiner* — Dapinder Singh
(74) *Attorney, Agent, or Firm* — MASCHOFF BRENNAN

(57) ABSTRACT

A method of power generation is provided that uses one or more structures made of zirconium tungstate in a convection fluid that rise or fall with temperature to create a reverse convection current cycle. The method can include heating the one or more zirconium tungstate structures to cause a decrease in volume and sink in the convection fluid. The method can include cooling the one or more zirconium tungstate structures to cause an increase in volume and rise in the convection fluid. The method includes generating power from the reverse convection current cycle.

19 Claims, 15 Drawing Sheets

(56) References Cited

U.S. PATENT DOCUMENTS

2022/0239214 A1* 7/2022 Hagen ............... H02P 25/064
2023/0402956 A1* 12/2023 Beachnau ........... B32B 17/06

OTHER PUBLICATIONS

United States Environmental Protection Agency; "Power Generation Using Megnetohydrogynamic Generation with a Circulation Flow Driven by Solar-Heat-Induced Natural Convection"; Webpage; Aug. 29, 2008; located at: https://cfpub.epa.gov/si/si_public_record_report.cfm?Lab=NCER&count=10000&dirEntryId=187263&searchall=&showcriteria=2&simplesearch=0&timstype; 5 pages.

Herdy, Roger, "Rapidly Deployed Launch Monitors for Sea-Based Missile Defense", Joint Army-NASA-Navy-Air Force (JANNAF) Conference Proceedings, May 2013.

"Water on the Web"; a project that allows high school and college students to monitor Minnesota lakes; Technical Report; Webpage; located at: http://www3.math.uni-paderborn.de/~agbiehler/DataSharing/WOW/WOW.html; 8 pages.

Monteith, John, and Mike Unsworth. Principles of environmental physics: plants, animals, and the atmosphere. Academic Press, 2013.

Fritzson, Peter, Peter Aronsson, Håkan Lundvall, Kaj Nyström, Adrian Pop, Levon Saldamli, and David Broman; "The OpenModelica modeling, simulation, and development environment"; In 46th Conference on Simulation and Modelling of the Scandinavian Simulation Society (SIMS2005); Trondheim, Norway; Oct. 13-14, 2005; 8 pages.

Rimmer, Alon; "Empirical Classification of Stratification Patterns in Warm Monomictic Lakes"; Israel Oceanographic and Limnological Research Institute; Stuttgart; Oct. 2006; DOI:10.1080/03680770.2006.11902993; 4 pages.

Ahamed, Raju, Kristoffer McKee, and Ian Howard. "A Review of the Linear Generator Type of Wave Energy Converters' Power Take-Off Systems"; Sustainability 14, No. 16; Aug. 8, 2022); 9936; https://doi.org/10.3390/su14169936.

* cited by examiner

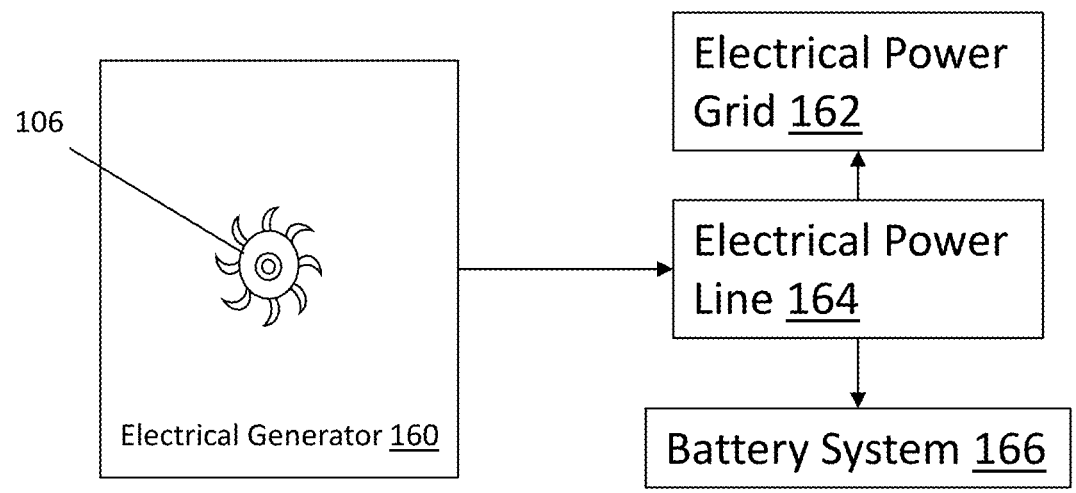
*FIG. 1B*
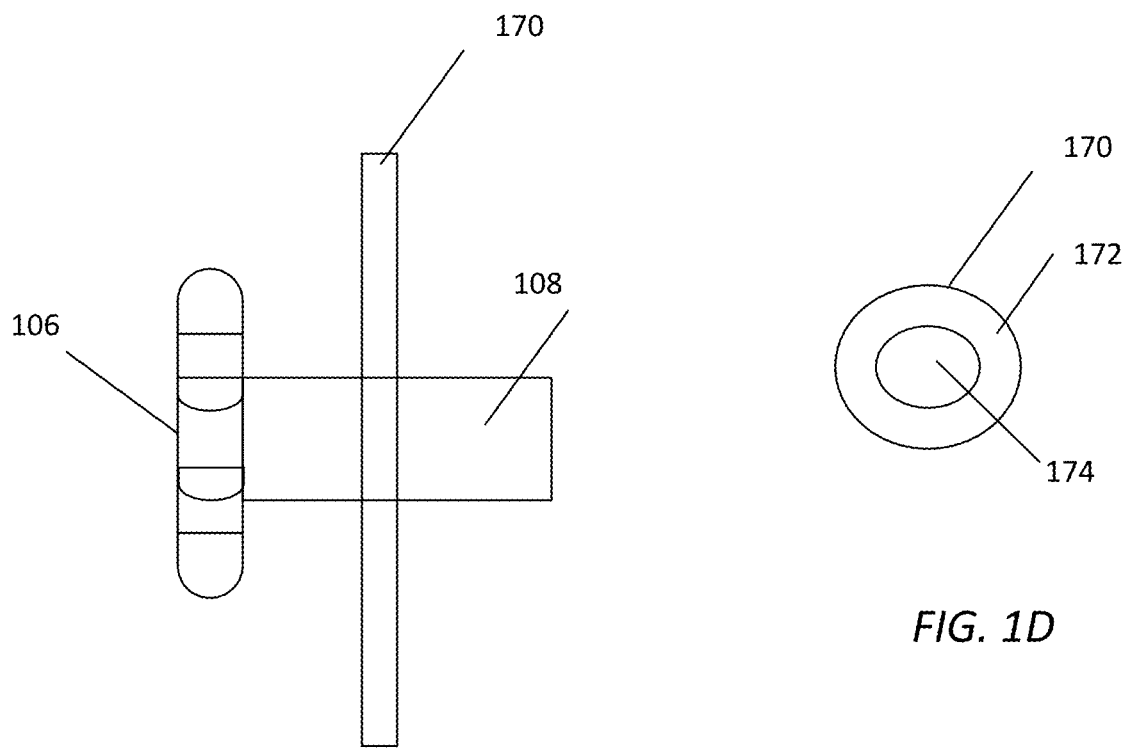
*FIG. 1C*
*FIG. 1D*

REVERSE CONVECTION POWER GENERATION

CROSS-REFERENCE TO RELATED APPLICATIONS

This patent application claims priority to U.S. Provisional Application No. 63/480,427 filed Jan. 18, 2023, which provisional is incorporated herein by specific reference in its entirety.

BACKGROUND

Field

The present disclosure relates to systems and methods of use for generating electrical power using reverse convection fluid currents.

Description of Related Art

Convection is a process where heat is transferred by movement of a heated fluid such as air or water. Convection often naturally results from a common characteristic of fluids where the fluids expand from being heated relative to surrounding fluids. Typical fluids and most materials have a positive temperature coefficient of expansion. When fluids and most materials are heated, they typically become less dense, and thereby volume and buoyancy increase for floating flow. With increased buoyancy, the fluids rise. As typical fluids cool down, density increases and buoyancy decreases, which results in sinking flow. Convection currents occur when rising and sinking happen repeatedly. If the energy transfer of heating and cooling are constant, these currents adhere to a constant time dependent oscillation.

Zirconium tungstate is not a typical material by being a material which has a negative temperature coefficient of volume expansion, which means that heating zirconium tungstate decreases its volume instead of increasing the volume, and cooling zirconium tungstate increases the volume instead of decreasing the volume. As such, zirconium tungstate behaves differently from typical materials in that heat causes shrinking of the zirconium tungstate. Zirconium tungstate exhibits isotropic expansion; the dimensional changes are equal in all directions when thermal energy (heat) is provided.

The subject matter claimed in the present disclosure is not limited to embodiments that solve any disadvantages or that operate only in environment such as those described above. Rather, this background is only provided to illustrate one example technology area where some embodiments described in the present disclosure may be practiced.

SUMMARY

In an example embodiment, a method of power generation, comprising: providing one or more structures made of a material having a negative thermal expansion coefficient (NTEC structures); placing the one or more of the one or more NTEC structures in a convection fluid; heating the one or more NTEC structures to cause a decrease in volume of the one or more NTEC structures such that the one or more NTEC structures sink in the convection fluid; cooling the one or more NTEC structures to cause an increase in the volume of the one or more NTEC structures such that the one or more NTEC structures rise in the convection fluid; generating a reverse convection cycle in the convection fluid with the one or more NTEC structures, wherein the one or more NTEC structures sink after the one or more NTEC structures increases in temperature past an upper temperature threshold and rise after the one or more NTEC structures decreases in temperature past a lower temperature threshold; and generating power from the reverse convection cycle. The NTEC can be selected from zirconium tungstate, $AM_2O_8$, $HfV_2O_7$, $ZRV_2O_7$, titanium alloy (e.g., ALLVAR Alloy 30), carbon fibers, quartz, zeolite, scandium trifluoride, and combinations thereof, wherein A is Zr or Hf, and M is Mo or W, or other NTEC materials that are developed.

In some embodiments, a method of power generation can include: providing one or more structures made of zirconium tungstate; placing the one or more zirconium tungstate structures in a convection fluid; heating the one or more zirconium tungstate structures to cause a decrease in volume of the one or more zirconium tungstate structures such that the one or more zirconium tungstate structures sink in the convection fluid; cooling the one or more zirconium tungstate structures to cause an increase in the volume of the one or more zirconium tungstate structures such that the one or more zirconium tungstate structures rise in the convection fluid; generating a reverse convection current cycle in the convection fluid with the one or more zirconium tungstate structures, wherein the one or more zirconium tungstate structures sink after the one or more zirconium tungstate structures increases in temperature past an upper temperature threshold and rise after the one or more zirconium tungstate structures decreases in temperature past a lower temperature threshold; and generating power from the reverse convection current cycle. In some aspects, the zirconium tungstate structures are spherical. In some aspects, the zirconium tungstate structures are contained in a housing structure. In some aspects, the housing structure is closed to a lateral fluid environment so as to entrap the reverse convection current cycles generated by the one or more zirconium tungstate structures in the convection fluid. In other aspects, the housing structure is open to a lateral fluid environment to allow mixing of the lateral fluid environment and the convection fluid. In some aspects, the housing structure is located within a thermocline fluid having a warmer upper temperature and cooler lower temperature. In some aspects, the convection fluid is water. In some aspects, the thermocline fluid is water.

In some embodiments, the method includes: generating the power with at least one turbine that is configured to rotate following the reverse convection current cycle of the zirconium tungstate structures and/or reverse convection current cycle of the convection fluid; and generating electricity with a power generator configured to generate power from mechanical rotation of the turbine.

In some embodiments, the method includes providing the electricity to at least one of an electrical power line, electrical power grid, battery system, or electrical device.

In some embodiments, a reverse convection power generation system can include: one or more zirconium tungstate structures that are configured to decrease in volume when being heated and increase in volume when being cooled; a convection fluid containing the one or more zirconium tungstate structures; one or more turbines configured to rotate in response to vertical movement of the one or more zirconium tungstate structures and/or convection fluid; a power generator configured to generate power from rotation of the one or more turbines; and a housing structure having the one or more zirconium tungstate structures, the convection fluid, and the one or more turbines. In some aspects, the reverse convection power generation system can include one or more floatation devices coupled with the housing structure. In some aspects, the reverse convection power generation system includes a mechanical system configured for moving the one or more floatation devices relative to the housing structure. In some aspects, the housing structure includes solid walls. In some aspects, the housing structure includes porous walls.

In some embodiments, the reverse convection power generation system includes one or more photovoltaic cell panels coupled with an upper region of the housing structure. In some aspects, a heater can be operably coupled with an upper region of the housing structure so as to be configured to heat the convection fluid. The heater can be coupled to the solar panels.

In some embodiments, the reverse convection power generation system includes one or more coupling members that couple the housing structure to another structure or ground. In some aspects, an electricity distribution system or an electricity storage system is connected to the system.

In some embodiments, an object can include spherical zirconium tungstate. In some aspects, the spherical zirconium tungstate is configured in accordance with one or more of: includes a hollow internal region within the spherical zirconium tungstate; includes a porous material within the spherical zirconium tungstate; includes gas within the spherical zirconium tungstate; or includes a floatable material within the spherical zirconium tungstate.

The objects and advantages of the embodiments will be realized and achieved at least by the elements, features, and combinations particularly pointed out in the claims. Both the foregoing general description and the following detailed description are given as examples and are explanatory and are not restrictive of the invention, as claimed.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 1B includes a schematic representation of a reverse convection power generation and distribution system.

FIG. 1C includes a side view that illustrates a turbine assembly and power generator.

FIG. 1D includes a cross-sectional view of a support structure configured with an electrical transmission core.

Figure 1:
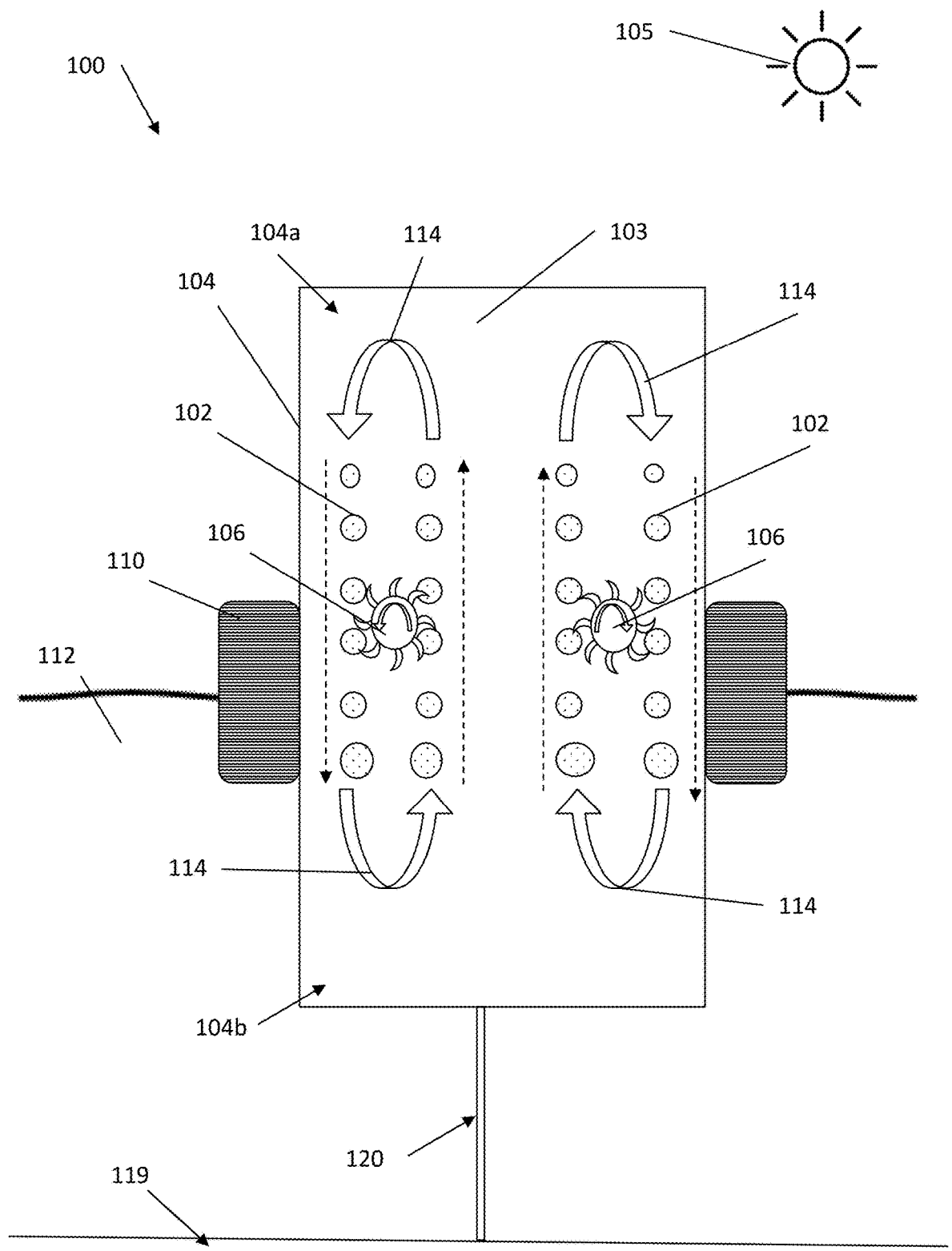
FIG. 1 illustrates an embodiment of a reverse convection power generation system.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present invention provides a power generation device that may include one or more spherical structures made primarily of zirconium tungstate (ZT) that are placed in water or other convection fluid. Zirconium tungstate has a negative temperature coefficient of volume expansion. Because of the negative temperature coefficient of volume expansion, the spherical structures may decrease in volume and sink in water or other convection fluid in response to being heated past an upper threshold temperature or having a higher temperature than the threshold. That is, at the upper threshold, the volume will be at the point where the buoyancy is overcome and sinking starts to occur. The spherical structure may increase in volume during the sinking in the thermocline of the convection fluid as it loses heat to the cooler surroundings, until reaching a volume with a buoyancy that overcomes sinking, and then the spheres will begin to rise in water (or another convection fluid with a thermocline). That is, the spheres increase in volume in response to being cooled past a lower threshold or having a lower temperature than the lower threshold. Vertical movement, with some horizontal motion driven by interactions (such as wakes from, or collusion with, other spheres also in proximity), of the spherical structures may generate reverse convection currents. The reverse convection current can be reverse to the convection current of the convection fluid.

However, it should be recognized that the zirconium tungstate structures can be other shapes than just spherical. Conceptually, the zirconium tungstate structures can have any rounded or somewhat spherical shape or be any volumetric sphere, oval, polygon or the like. While zirconium tungstate is used as an example, other materials with negative thermal expansion coefficients (e.g., NTEC structures) can be used in place of the zirconium tungstate structures. As such, reference to zirconium tungstate herein also refers to other NTEC materials, such as $AM_2O_8$, $HfV_2O_7$, $ZRV_2O_7$, titanium alloy (e.g., ALLVAR Alloy 30), carbon fibers, quartz, zeolite, scandium trifluoride, and combinations thereof, wherein A is Zr or Hf, and M is Mo or W.

If a neutrally buoyant sphere (or other such appropriately tailored shape) of zirconium tungstate is heated, buoyancy decreases, and then sinking occurs. If this sinking moves the sphere into a zone of cooler fluid (e.g., like a thermocline in a lake or ocean water), while cooling the zirconium tungstate sphere undergoes an expansion and an increase in buoyancy that leads floating upwards against gravity. As such, the convection cycle for a zirconium tungstate sphere is a reverse convection cycle. Heat transfer into and out of the thermocline caused by the interactions of the sphere with the fluid can be harnessed to do work, such as weight of the spheres lifted through a height, and work within this thermodynamic system can interact with its surroundings and exchange energy in the form of reverse convection. This exchange of energy can be construed as conversion to physical power, whereby the creation of this power can be converted to electricity.

The zirconium tungstate structures may be housed in a container or other housing structure, including but not limited to cylindrical volumes, rectangular volumes, or other shapes that can entrap the plurality of zirconium tungstate structures placed within. The housing structure may be configured to entrap and/or guide the reverse convection currents generated by the zirconium tungstate structures interacting with the convection fluid to rise and sink in a reverse convection current cycle. A turbine to extract the work from the power potential generated within the reverse convection currents may also be included within the housing structure. The turbine may be configured to rotate in response to the reverse convection currents or periodic cycle of the zirconium tungstate structures. The turbine may be coupled with an electrical power generator, where the electrical power generator is configured to generate power from rotation of the turbine.

In some aspects, the power generation device may include one or more suspended (e.g., floating or otherwise deployed) devices attached to the housing structure. The one or more suspended devices can be floating devices that may be configured to control a depth of portion and/or position of the housing structure submerged in the water thermocline. In these and other aspects, the power generation device may further include a support structure configured to attach the power generator to the ground or other structural member for immobilization, or six degrees of freedom movement upon a need to optimize or maximize the opportunity to harness energy extraction from the thermocline.

In some embodiments, a spherical or other shaped structure made of zirconium tungstate can be used in water for power generation. Ceramic crystalline zirconium tungstate, $Zr(WO_4)_2$, (e.g., which contains $ZrO_6$ octahedra and $WO_4$ tetrahedra) is unique in being a material which has a negative temperature coefficient of volume expansion. That is, the ceramic crystal zirconium tungstate contracts in all directions on heating over a very large temperature range. Some other materials have a negative expansion coefficient in one direction but are positive in other directions. Most materials that exhibit negative thermal expansion only exhibit the negative thermal expansion over a narrow range of temperature.

For the zirconium tungstate the negative expansion occurs over a very wide temperature range: from near absolute zero to 800 degrees Celsius (° C.). A contraction of the zirconium tungstate amounts to 0.75% on heating from 1 degrees Kelvin (° K) (e.g., where 1° K is near Absolute Zero) to 1050 K (1430° Fahrenheit) when the zirconium tungstate decomposes into oxides $ZrO_2$ and $WO_3$. A reduction in volume with increased temperature occurs because the oxygen atom in the Zr—O—Zr bond vibrates up and down with increasing temperature, effectively shortening the Zr—O—Zr bonds, bringing zirconium atoms closer together, and thus increasing the density (and thus decreasing the overall volume as in the case of a sphere) of the zirconium tungstate.

In some embodiments, one or more structures that are spherical (or other shape) may be built out of the zirconium tungstate. The spherical structures may be crafted to be neutrally buoyant at a certain temperature when suspended in a fluid. For example, the zirconium tungstate structures may initially be suspended, or float in place, when placed in water. In some aspects, temperature of the zirconium tungstate structures may increase due to heat from different heat sources. For instance, the zirconium tungstate structures may be exposed to sunlight and/or warmer layers of water within a thermocline, which may increase the temperature of each zirconium tungstate structure. In response to being heated, the zirconium tungstate structures may shrink in volume due to its increase in increase in density, which may decrease buoyancy. As the buoyancy decreases, the zirconium tungstate structures may sink.

For example, as the zirconium tungstate structures sink, the structures may contact deeper cooler water which may decrease the temperature, and thereby increase the volume of the zirconium tungstate structure and decrease the density thereof. In response to being cooled, the zirconium tungstate structures may regain buoyancy (e.g., corresponding to a return to neutral buoyancy or even physically shift to a greater buoyancy), due to the increase in volume and decrease in density, and may rise. The heat transfer amongst the zirconium tungstate structures from the convection fluid will result in a rise and/or sink in a thermocline of the convection fluid, resulting in reverse convection. This can cause the convection fluid to also flow in reverse convection.

Turning to the figures, FIG. 1 illustrates an example diagram of an embodiment of a reverse convection power generation system 100. The reverse convection power generation system 100 may include one or more spherical structures 102 built out of zirconium tungstate. The spherical structures 102 may move vertically as changes in temperature occur due to external heat transfer such as temperature of a convection fluid 103 (e.g., water) or heat from a heat source 105 such as the sun, that heats the convection fluid 103. The spherical structures 102 may be housed within a housing structure 104, which can be a rectangular or cylindrical structure. The housing structure 104 can include the convection fluid 103 with the spherical structures 102 floating in the convection fluid 103. The convection fluid 103 can be water or other fluid that can transfer heat to and from the spherical structure 102. The housing structure 104 may be submerged in a thermocline fluid 112 (e.g., water or other fluid containing a thermocline), at least partially or fully. The power generation system 100 may further include at least one turbine assembly 106, or a plurality thereof, placed within the housing structure 104. The turbine assembly 106 may be configured to rotate in response to the induced vertical movement of the fluid by the spherical structures 102, where the fluid flow is shown by the arrows, which is a reverse convection flow. The turbine assembly 106 may be further coupled to a power generator 108 (see, FIG. 1C) that is configured to generate power from the rotating of the turbine assembly 106.

In some embodiments, the power generation system 100 may include one or more floating devices 110 attached to the housing structure 104. The housing structure can have solid walls, or may be open to allow horizontal movement of the fluid (e.g., such as a naturally occurring current), past its boundary perimeter. The one or more floating devices 110 can be any floating means may be configured to control a depth of a portion of the housing structure 104 submerged in the water thermocline fluid 112, or other thermocline fluid. Notably, the spherical structures 102 are smaller at the top and larger at the bottom. Also, the housing can be placed on the floor of the thermocline fluid, such as a bottom of a lake or ocean. A motorized structure may also be mounted to the floor that uses the motors to move the housing structure relative to the thermocline fluid, such as up or down, but also laterally.

In some embodiments, the zirconium tungstate structures may be built by a plasma deposition process. For example, an inert material, such as a tooling foam capable of withstanding heat of material, may be used as a substrate for the ceramic zirconium tungstate to be deposited therein (e.g., chemical vapor deposition, etc.) with a plasma spray. The process may be done to make spherical structures primarily made from zirconium tungstate. In some instances, the zirconium tungstate structures may be fitted with features that promote heat transfer such as embedded and/or protruding fins. The tooling foam can then be etched out with a solvent that leaves a ceramic shell, which then is sealed with a final pass of plasma spray of the ceramic. A weight of deposited material surrounding the spherical structure may compensate for weight of displaced water when the zirconium tungstate structure is placed in water or other convection fluid, thus making the zirconium tungstate structures neutrally buoyant. The zirconium tungstate structures (e.g., containing exterior heat transfer enhancing or directional stability features such as fins), made primarily of zirconium tungstate may have a negative temperature coefficient of volume expansion. The zirconium tungstate structures may contract upon heating and expand upon cooling.

In some embodiments, the spherical structures 102 (e.g., zirconium tungstate) in the convection fluid 103 within the housing structure 104 can be placed in a water thermocline 112 or other fluid with a thermocline. As such, the zirconium tungstate structures may heat and cool in a cycle, and thereby may generate reverse convection currents in the convection fluid 103 due to upper level heating and lower level cooling, which is shown by the arrows. The spherical structures 102 may decrease in volume in response to rising to a higher temperature at the top of the convection fluid, such as near a heater 105 (e.g., sun). In response to the decrease in volume, the spherical structures 102 may sink in the convection fluid 103 to the bottom. The spherical structures 102 may contact the convection fluid 103 with lower temperature as it sinks deeper towards the bottom of the housing structure 104. The spherical structures 102 may be cooled to a lower temperature where the spherical structures 102 may increase in volume and then begin to rise towards the top of the housing structure 104. The spherical structures 102 may repeatedly move vertically through temperature gradients in the convection fluid 103 to increase in temperature and then to decrease in temperature to create a cyclic reverse convection flow. The spherical structures 102 may generate reverse convection currents 114 from repeated vertical (e.g., cyclical, with some horizontal motion) movements.

In some embodiments, the spherical structures 102 may be housed in the housing structure 104. In some aspects, the housing structure 104 may be built as open mesh structure or solid containers. The shape of the housing structure 104 is not limited to cylindrical shapes if case of manufacturing or physical maximization of the thermoclines being targeted can use other shapes. Also, other permeable, porous or open mesh housing or housing structures 104 with fluid conduits can be used where the open structure allows the spherical structures 102 to be retained therein, and also allow the thermocline fluid (water) to flow into and out of the internal space of the housing structure 102 and thereby allow thermal exchange of heat with the water. The housing structure 104 may entrap the reverse convection currents 114 generated by the spherical structures 102. Alternatively, the housing structure can be a solid-walled container, which can be fluid tight.

Figure 2A:
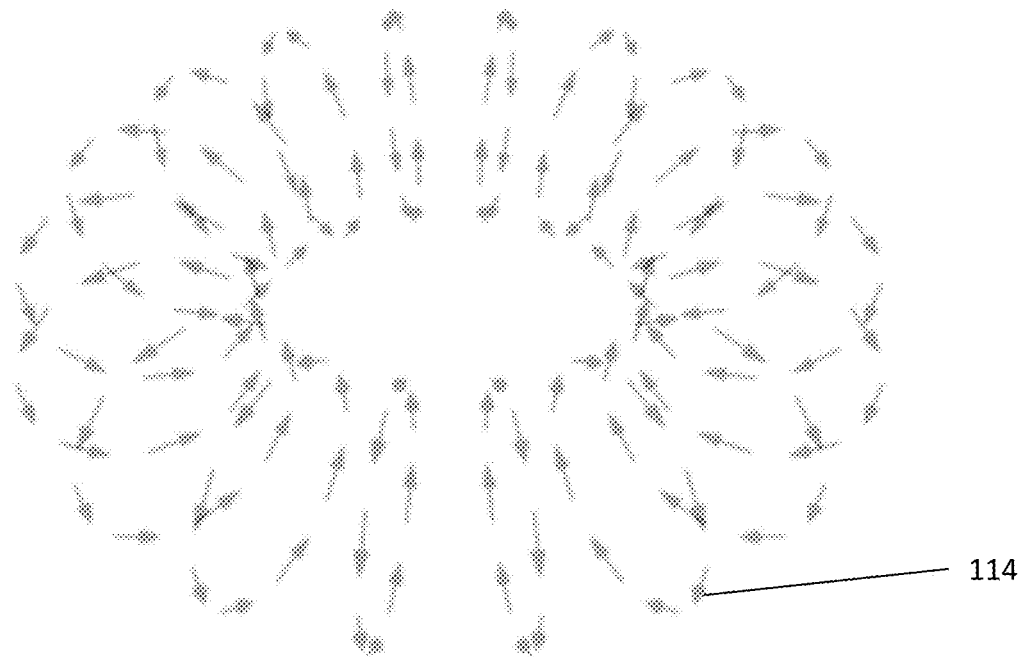
FIG. 2A illustrates an example reverse convection current cycle.

For example, FIG. 2A illustrates an example of the reverse convection flow of the spherical structures in the convection fluid directed by the housing structure with the reverse convection currents 114. The housing structure and/or flow directional features may direct the flow of the convection fluid in the reverse convection currents as a torus. FIG. 2 may illustrate that an inner torus flow direction is upward while an outer torus flow direction is downward, but this may be reversed.

In some embodiments, the housing structure 104 may include a heat-exposed portion 104*a*, and a cooling exposed portion 104*b*. In these and other aspects, the housing structure 104 may allow heat energy to be transferred to the spherical structures 102 through the heat-exposed portion 104*a* via the combined and/or separate processes of convection, advection, conduction, or radiation.

In some embodiments, the housing structure 104 may be placed fully submerged in a water sink (e.g., thermocline fluid). For example, the one or more floating devices 110 may be configured to hold the housing structure 104 fully under the water thermocline fluid 112. In these and other aspects, the spherical structures 102 may be heated and cooled by the thermocline in the thermocline fluid 112. For example, the spherical structures 102 may be heated when the spherical structures 102 are placed in upper layers of the housing structure 104 that correspond with upper levels of the thermocline fluid 112. As the spherical structure 102 is heated, a density of the spherical structures 102 may increase, and its volume may decrease. The spherical structures 102 may sink as their volume decreases and they lose buoyancy. As the spherical structures 102 sink deeper through the housing structure 104 to lower levels commensurate with lower levels (e.g., colder) of the thermocline fluid 112, temperature of the thermocline may decrease. Temperature of the spherical structures 102 may decrease as the spherical structures 102 make continuous contacts with cooler layers of the convection fluid 103 in the housing structure 104 that are in cooler regions of the thermocline.

Figure 3:
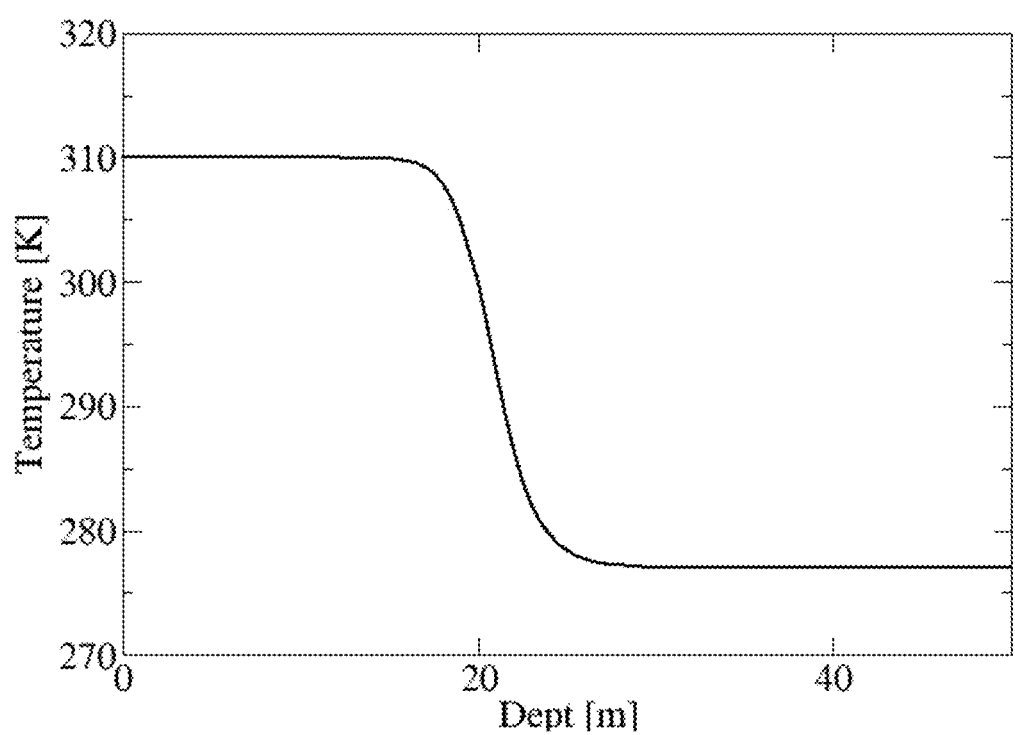
FIG. 3 includes a graph of a temperature profile of a thermocline.

For example, FIG. 3 illustrates an example of temperature variation of the thermocline. FIG. 3 illustrates how the temperature decreases as depth of the thermocline increases. As the temperature of the spherical structures 102 decrease, the density of each spherical structure 102 may decrease, and the volume (and thus buoyancy), may increase. The spherical structures 102 may rise (e.g., in a generally vertical direction), as the volume increases. In response to reaching the upper layers of the thermocline, the temperature of the spherical structures 102 may increase again, causing the spherical structure 102 to shrink and sink. The spherical structures 102 may repeat (i.e., cycle), moving vertically as the temperature of the spherical structures 102 increase and decrease in the thermocline. The spherical structures themselves may rotate the turbine to cause power generation regardless of direction of movement of the fluid.

Figure 2B:
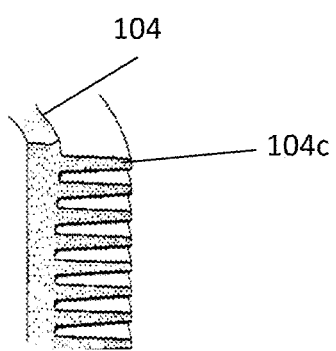
FIG. 2B illustrates an example of a housing structure having heat transfer fins.

In these and other embodiments, the power generation system may further include heat transfer structures attached to the housing structure. FIG. 2B shows a portion of the housing structure 104 having heat transfer structures 104c, such as fins. The heat transfer structures 104c may be placed on a portion of the housing structure 104 exposed to a warmer portion of the thermocline, a cooler portion, or at any location or all across the housing structure 104. The heat transfer structures 104c may be configured to direct flow of a localized water current to better heat transfer to the convection fluid 103 containing the spherical structures 102. The fins may also be included on the surface of the zirconium tungstate spheres.

In some embodiments, the housing structure 104 may be placed partially or totally in the thermocline fluid 112. The one or more floating devices 110 may keep the housing structure 104 floating, where at least some part of the housing structure (e.g., 104a) is out of the thermocline fluid 112. The one or more floating devices 110 may be configured to control a depth of a portion of the housing structure 104 under a surface of the thermocline fluid 112. As such, the entire housing structure 104 can be submerged in the thermocline fluid 112 The floating devices may be structures connected to a bottom of the thermocline fluid.

In some embodiments, the housing structure 104 may have various shapes and configurations. In some instances, the housing structure 104 can be adapted to be fully submerged in the water or other fluid having the thermocline (e.g., thermocline fluid 112). That is, the housing structure 104 may be fully submerged with the top being 1, 2, 5, 10, 25, 50, 75, 100 meters, or other dimension under the surface of the water or other thermocline fluid 112. The housing structure 104 can be attached to floating devices 110 or anchored to a ground 119 via an anchor cable 120 or other anchor structure otherwise located in a specific region within a thermocline fluid. Anchored housing structures can still move vertically using the mechanical system 130. Also, the anchor cable 120 can include an electrical cable that that transfers generated electricity from the turbines 106 to a power storage device or power grid, or the like.

Figure 1A:
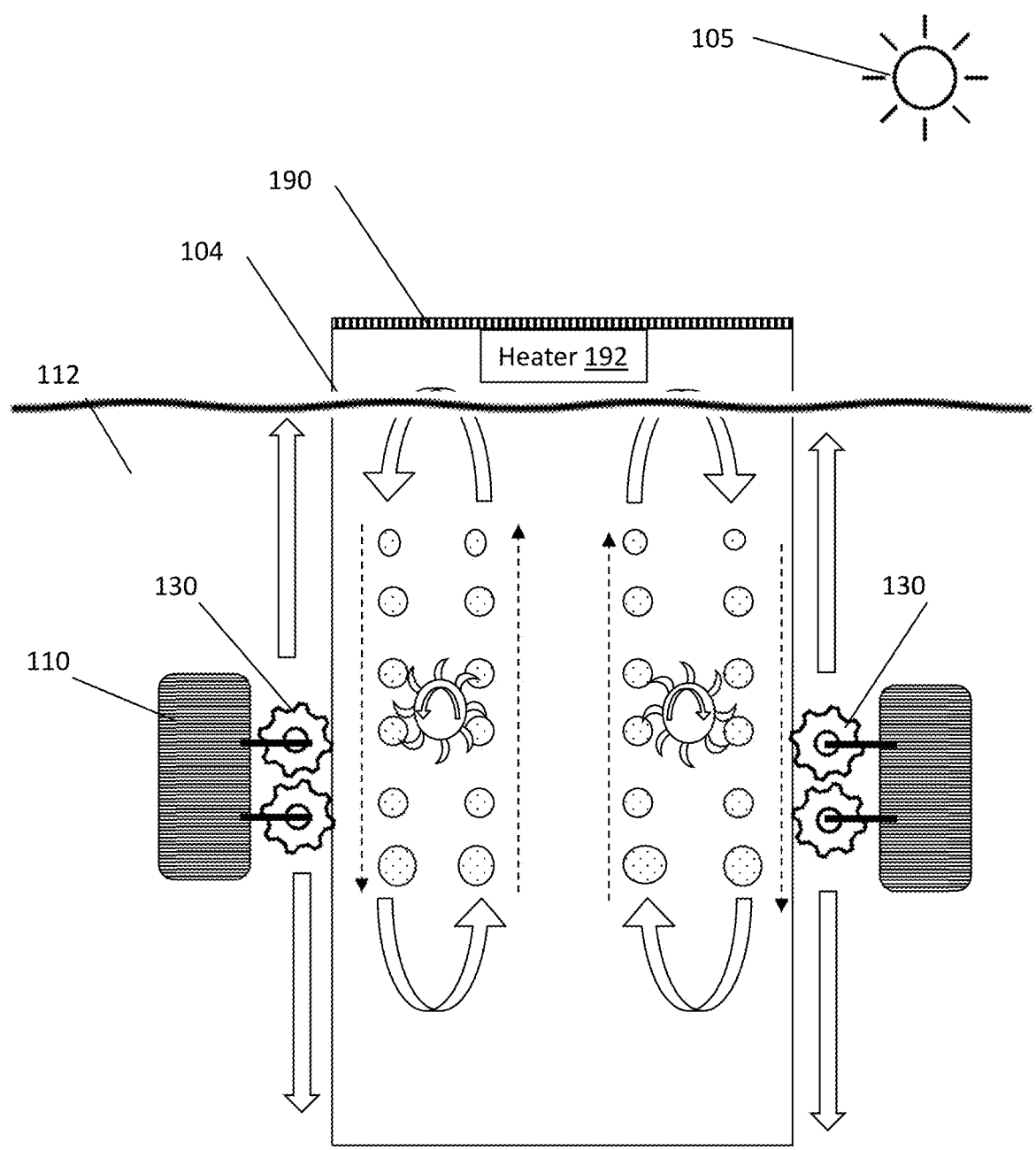
FIG. 1A illustrates another embodiment of a reverse convection power generation system.

As shown in FIG. 1A, the housing structure 104 can be adapted so that it can be selectively raised or lowered within the water or thermocline fluid 104, which can include machinery 130 (e.g., motor, gears, track, etc.) that change the relative position of the floating devices 110 relative to the housing structure 104. The machinery can raise or lower the floating devices 110 relative to the housing structure 104, such that the housing structure 104 can raise or lower relative to the surface of the water or other thermocline fluid. The movement provided by the machinery 130 can be vertical up and down as shown by the arrows. Even when completely under the surface, the housing structure 104 can still include turbine assemblies 106 connected to power generators for generating electrical power, which are connected to power transmission lines to transmit the generated electricity to a battery or power grid, or elsewhere.

FIG. 1B shows the turbine assembly connected to an electrical generator 160. The electrical generator 160 is electrically coupled to an electrical power line 14 that can distribute the electricity as needed and desired. The electrical power line 164 can provide the electricity to an electric power grid 162 for electricity distribution and/or a battery system 166 for electrical storage. The electrical power line 164 can thereby provide electricity to electricity-powered devices. The turbine assembly 106 can include a Pelton wheel turbine that includes turbine vanes.

FIG. 1C shows a side view of the turbine assembly 160 coupled to the generator assembly 108 that generates electricity. The generator assembly 108 is connected to a support structure 170 that supports the assemblies within the housing structure 104.

FIG. 1D shows a cross-sectional view of the support structure 170 having a casing 172 and electrical wire core 174. This allows the support structure 170 to provide support to the turbine assembly and provide a conduit for providing the generated electricity from the generator assembly 108.

In these and other embodiments, the heat-exposed portion of the housing structure 104 may be a portion of the housing that is above the surface of the water 112. In these and other embodiments, at least the heat-exposed portion of the housing structure 104 may be composed of material transparent to light. The heat-exposed portion may allow sunlight to travel through the cylindrical structure 104 to increase the temperature of the spherical structures 102. In another option, at least the upper portion of the housing can be black to absorb radiation heat from the sun.

In some embodiments, the heat-exposed portion may include photovoltaic cell panels 190, as shown in FIG. 1A. The photovoltaic cell panels 190 may be configured to obtain electrical energy from direct sunlight (e.g., 105). The electrical energy obtained by the photovoltaic cell panels 190 may be transferred to the spherical structures 102 to initiate generating of the reverse convection currents 114. In some instances, the photovoltaic cell panels 190 may be placed in a manner that covers multiple directions. For example, the photovoltaic cell panels 190 may be placed on all sides of the heat-exposed portion of the housing structure 104 to obtain sunlight regardless of where the sun is (e.g., inclination or orientation). In other instances, the photovoltaic cell panels 190 may be attached to a specific side of the heat-exposed portion of the housing structure 104. In these and other embodiments, the power generation system 100 may include a solar tracking system configured to track the sun's position and to rotate the housing structure 104 to allow the photovoltaic cell panels 190 to face the sun more constantly. Also, the photovoltaic cells panels 190 can be connected to one or more heaters 192 that heat the upper regions of the convection fluid 103 within the housing structure 104, and thereby supplement heat to the zirconium tungstate spherical structures 102.

In some embodiments, the turbine assembly 106 may be built within the housing structure 104. The turbine assembly 106 may include any suitable type of turbine, such as a Pelton turbine, a turbo turbine, a Kaplan turbine, a Francis turbine, a crossflow turbine, a fixed-pitch propeller, a screw turbine, among others, as well as combinations thereof. The turbine assembly 106 may rotate as the spherical structures 102 generate the reverse convection cycles or currents. In some embodiments, the housing structure 104 may include multiple turbine assemblies 106. In other embodiments, the housing structure 104 may be equipped with a single turbine assembly 106.

In some embodiments, the power generator 108 of FIG. 1C may be connected to the turbine assembly 106. The power generator 108 may transform mechanical energy of the turbine assembly 106 into electricity. In some embodiments, the power generator 108 may be a linear alternator configured to translate the motion of the turbine assembly directly into electrical power. FIG. 1C illustrates an example diagram of how the power generator 108 may be connected to the turbine assembly 106. In some embodiments, the power generator 108 may be directly connected to the turbine assembly 106.

In some embodiments, the housing structure 104 may be tethered to floor of the water (thermocline fluid) sink by a support structure, such as an anchor cable 120, metal structure, or other way to immobilize the housing structure 104 relative to a floor. In fact, any part of the housing structure 104 or power generator 108 can be attached to the bottom of the pool, lake, sea, or ocean that contains the thermocline fluid. In some embodiments, the support structure 170 may contain power transmission lines and act as a power routing structure. For example, the support structure 170 may be connected to the power generator as illustrated in FIG. 1C. In some embodiments, the support structure may transport power generated by the power generator to an electrical power grid 162. In some instances, the electrical power grid 162 or battery system 166 may be placed on the floor of the thermocline. In these and other embodiments, the electrical power grid may be connected to land or be placed on land. The electrical power grid 162 can be any type of electrical power grid, and may provide electricity to any other devices for utilizing the electrical power generated by the power generator.

The zirconium tungstate spherical structures may vary in size, and the sizes be used collectively and/or separately, or in conjunction with one another. Different sizes of the spherical structures may affect efficiency of the power generation system. Analysis has been conducted for a nominal range of 6 to 24 inch diameter spherical structures to examine a relationship between efficiency and size of the spherical structures. However, the spherical structures may vary largely from the nominal 6 to 24 in. diameter. For a sample spherical structure at 4 to 24 inch diameter, a temperature difference of 40 degrees Fahrenheit (° F.) may create a negative buoyancy of sufficient force to cause the spherical structure to sink against upward recirculation forces.

Upper layers of the water or other thermocline fluid can sufficiently exceed 86° F., where the spherical structures may gain sufficient negative buoyancy to sink. Lower layers of the water or other thermocline fluid may be less than 41° F., where the spherical structures may be cooled to gain positive buoyancy until it is neutrally buoyant again. In some embodiments, the spherical structures may vary in the depth of sinking when heated depending on the diameter of the spherical structures, the proximity of other spheres, or the temperature gradients caused be cross current effects.

Figure 4A:
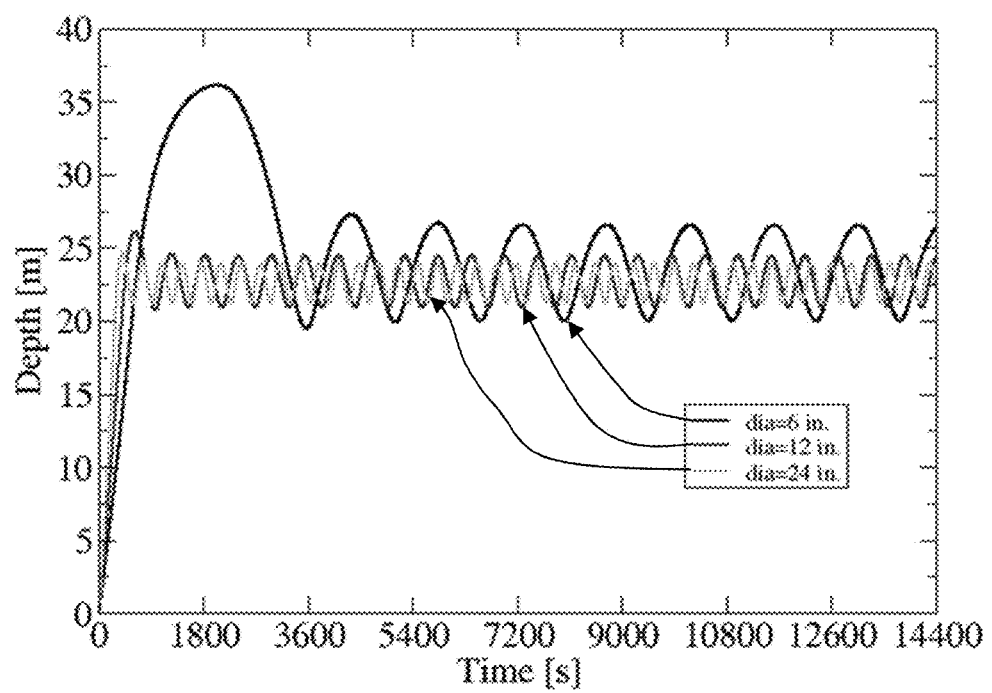
FIG. 4A includes a graph of a movement profile of zirconium tungstate spheres with different diameters.
Figure 4B:
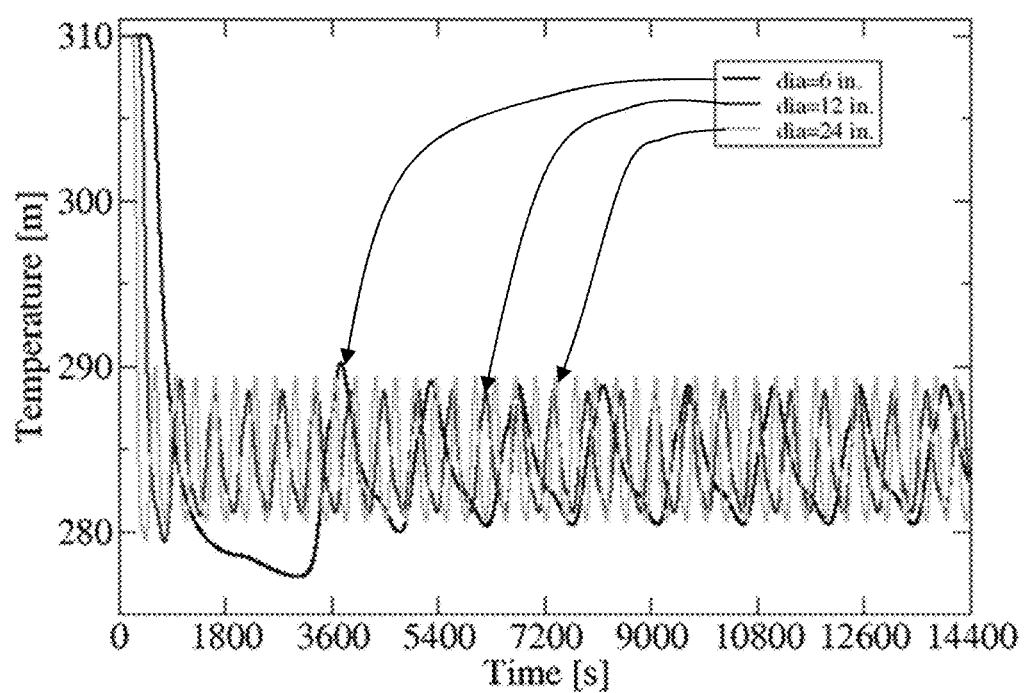
FIG. 4B includes a graph of a temperature profile over time of zirconium tungstate spheres with different diameters.
Figure 4C:
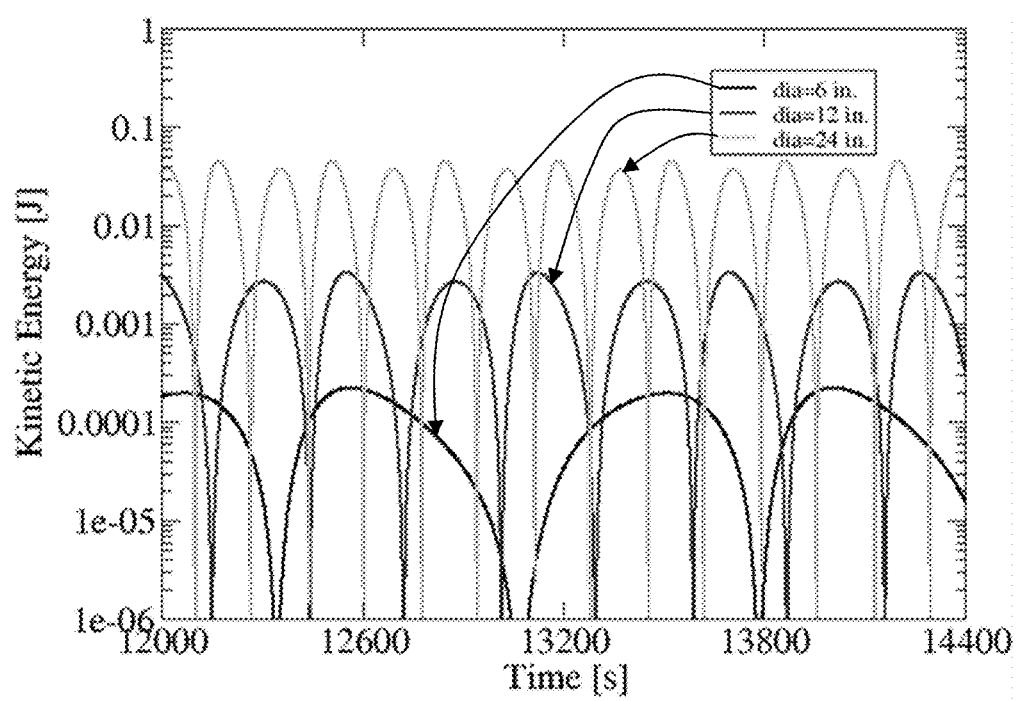
FIG. 4C includes a graph of a kinetic energy profile over time of zirconium tungstate spheres with different diameters.

For example, FIGS. 4A-4C illustrate results of simulating spherical structures of 6-inch, 12-inch, and 24-inch diameters for 14,400 seconds assuming a constant water density of 1,030 Kg/m³ and a zirconium tungstate material density of 5,090 Kg/m³, with conductivity of 50 W/m/K and a specific heat of 270 J/Kg/K and a thermal expansion coefficient of $-3.75 \, e^{-6}$ 1/K. FIG. 4A shows that the 6-inch diameter spherical structure has a larger amplitude of 6.5 meters (m) with a lower frequency of $0.7e^{-3}$ Hz compared to the 24-inch sphere, which has a reduced amplitude of ~2.6 m and higher frequency of $3e^{-3}$ Hz. FIG. 4B shows the oscillations of the different size spheres for temperature changes. FIG. 4C shows the kinetic energy of the different size spheres versus time.

Figure 5A:
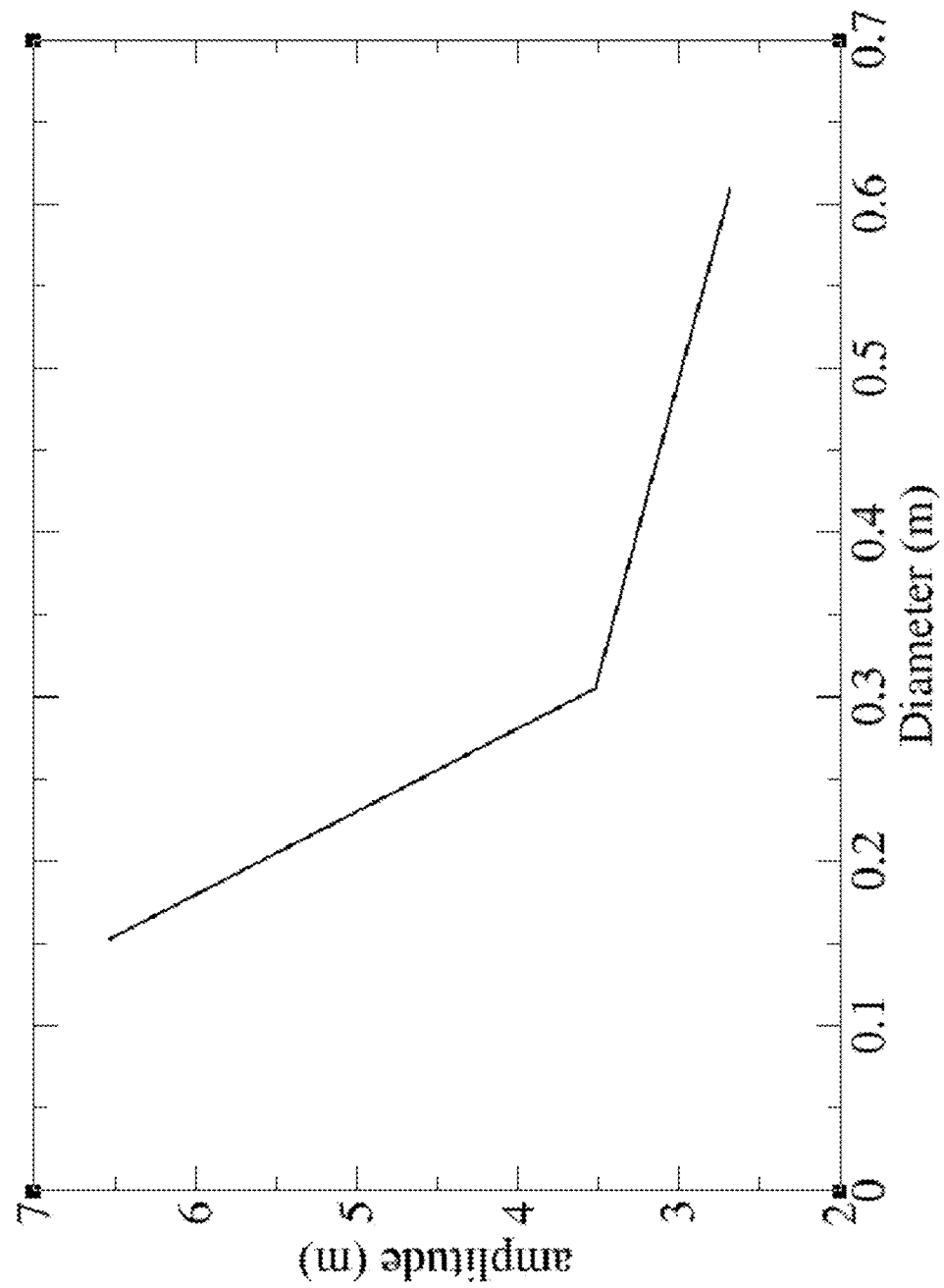
FIG. 5A includes a graph of amplitude of movement of zirconium tungstate spheres versus diameter thereof.
Figure 5B:
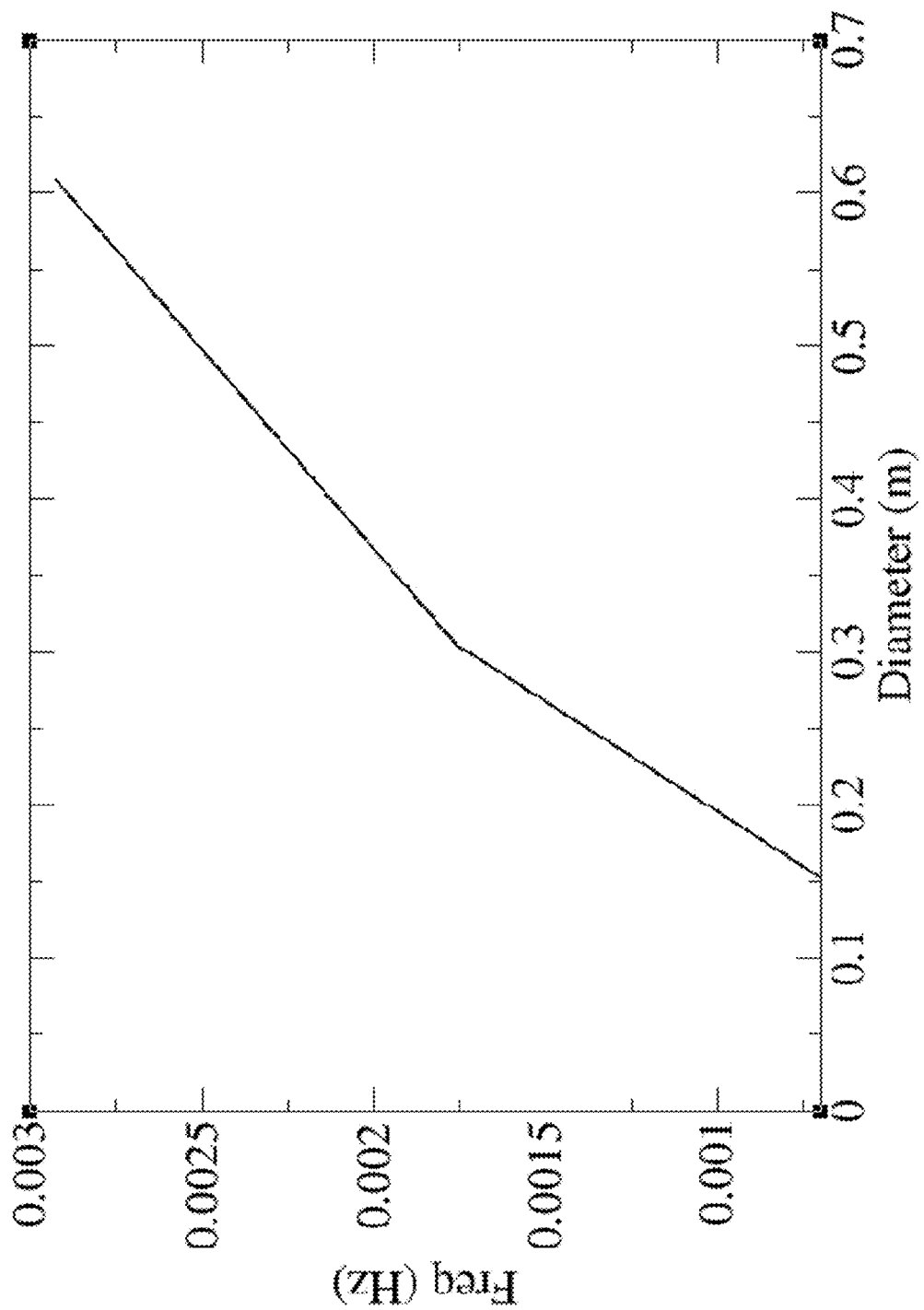
FIG. 5B includes a graph of frequency of movement of zirconium tungstate spheres versus diameter thereof.

FIG. 5A illustrates an example plot of amplitude of oscillation for various diameters of the spherical structures. FIG. 5B illustrates an example plot of frequency for the various diameters of the spherical structures. FIGS. 5A and 5B generally illustrate that as the diameter of the spherical structures increases, amplitude decreases and frequency increases. In some embodiments, the spherical structures may have a minimal diameter of 6 inches which may provide minimum buoyancy level required to prevent the spherical structures from continually sinking. The size of the neutrally buoyant zirconium tungstate structure can be at a defined temperature, such as 25° C.

Following equations and steps may govern processes used to show that as temperature drops, the spherical structures expand, creating an increasing upward buoyancy force and rising. As the temperature increases, the spherical structures contract again where the upward buoyance force decreases, causing the spherical structures to sink again. Rising and sinking of the spherical structures results in reverse convection currents which may cause sufficient momentum to generate power. Equation 1 represents density as a function of depth, Z, where Z is depth such that Z=0 at surface of water, and Z-axis is positive from the surface towards bottom of the water.

$$\rho_L = \rho_L(T_L, Z) \qquad \text{Equation 1}$$

$$T_L = T_L(Z) \qquad \text{Equation 2}$$

Equation 2 may represent temperature T in function of depth Z. For a particle with a volume $V_p$, and at rest in the water, total force on the particle, such as the spherical structure, may be given by Equation 3 where buoyancy force may be based on displacement volume. The total force on the particle may be represented by $\vec{F}_p$ while $m_p$ represents mass of the particle and g represents gravity.

$$\vec{F}_P = m_P g - \rho_L V_{P,displacement} \vec{g} \qquad \text{Equation 3}$$

Acceleration of the particle may then be given by Equation 4:

$$a_P(Z) = g\left(1 - \frac{\rho_L(Z) V_{P,displacement}(T, Z)}{m_P}\right) \qquad \text{Equation 4}$$

For particles moving slowly through the liquid, Stokes' drag or general laminar flow with $Re < 2 \times 10^5$ may be utilized which may be represented by Equation 5:

$$C_D = \frac{2 F_{Drag}}{\rho_L U_P^2 A_{cross-section}} = \frac{24}{Re_p} + \frac{4}{\sqrt{Re_P}} + 0.4 \qquad \text{Equation 5}$$

Then a total acceleration of the particle with motion may be given by Equation 6:

$$a_P(Z) = g\left(1 - \frac{\rho_L(Z) V_{P,displacement}(T, Z)}{m_P}\right) - \frac{F_{Drag}}{m_P} \qquad \text{Equation 6}$$

Heat transfer between the particle and surrounding liquid can be modeled as a lumped parameter model where Biot number hL/K<<1. Nussel number can be modeled as Equation 7.

$$Nu_P = \frac{h_{Convection}L}{k_{conduct}} = 0.34\, Re^{0.6} Pr\, 0.33 \qquad \text{Equation 7}$$

Energy equation for the particle may be represented by:

$$m_P C_p \frac{dT_P}{dt} = h_{Convection} A_{surface}(T_L - T_P) \qquad \text{Equation 8}$$

A particle velocity is given by equation 9.

$$a_P = \frac{dU_P}{dt} \qquad \text{Equation 9}$$

A particle displacement is represented by equation 10.

$$\frac{dZ}{dt} = U_P \qquad \text{Equation 10}$$

Change in volume of the particle as a function of temperature is given by equation 11.

$$\alpha_T = \frac{1}{V_P}\left(\frac{\partial V_P}{\partial T}\right)_{pressure} \qquad \text{Equation 11}$$

Volumetric expansion coefficient is typically 3 times the linear expansion coefficient. The displacement volume of the particle changes as the particle heats up or cools down.

$$\frac{d}{dt}V_{P,displacement} = \frac{dV_{P,displacement}}{dT}\frac{dT_P}{dt} = \alpha_T V_{P,displacement} \frac{dT_P}{dt} \qquad \text{Equation 12}$$

A displacement of an outer radius due to pressure loads from outside and inside of the spherical structure can be determined using equation 13.

$$R_{out,disp} = \frac{3 * D_{in}^3 * (P_{in} - P_{out}) * D_{out}}{(8 * E * [D_{out}^3 - D_{in}^3])} \qquad \text{Equation 13}$$

Where E is the young's modulus of the material and $D_{in}$ and $D_{out}$ are inner and outer diameters. An updated volume of the sphere can then be determined as:

$$V_{out,new} = \frac{\pi}{6}(D_{out} + 2 * R_{out,disp})^3 \qquad \text{Equation 14}$$

Finally, the updated volume based on expansion coefficient $\alpha_T$ can be determined using following expression.

$$V_{new} = V_{out,new} * (1 + 3 * \alpha_T * \Delta T) \qquad \text{Equation 15}$$

In accordance with the foregoing equations, the dimensions of the spheres and housing can be determined so that different systems can be configured for different thermoclines. This allows for identification of a thermocline, and then tailoring the dimensions of the system to obtain reverse convection cycles for the spheres. A computing system can be used to simulate various systems using the defined equations.

Figure 7:
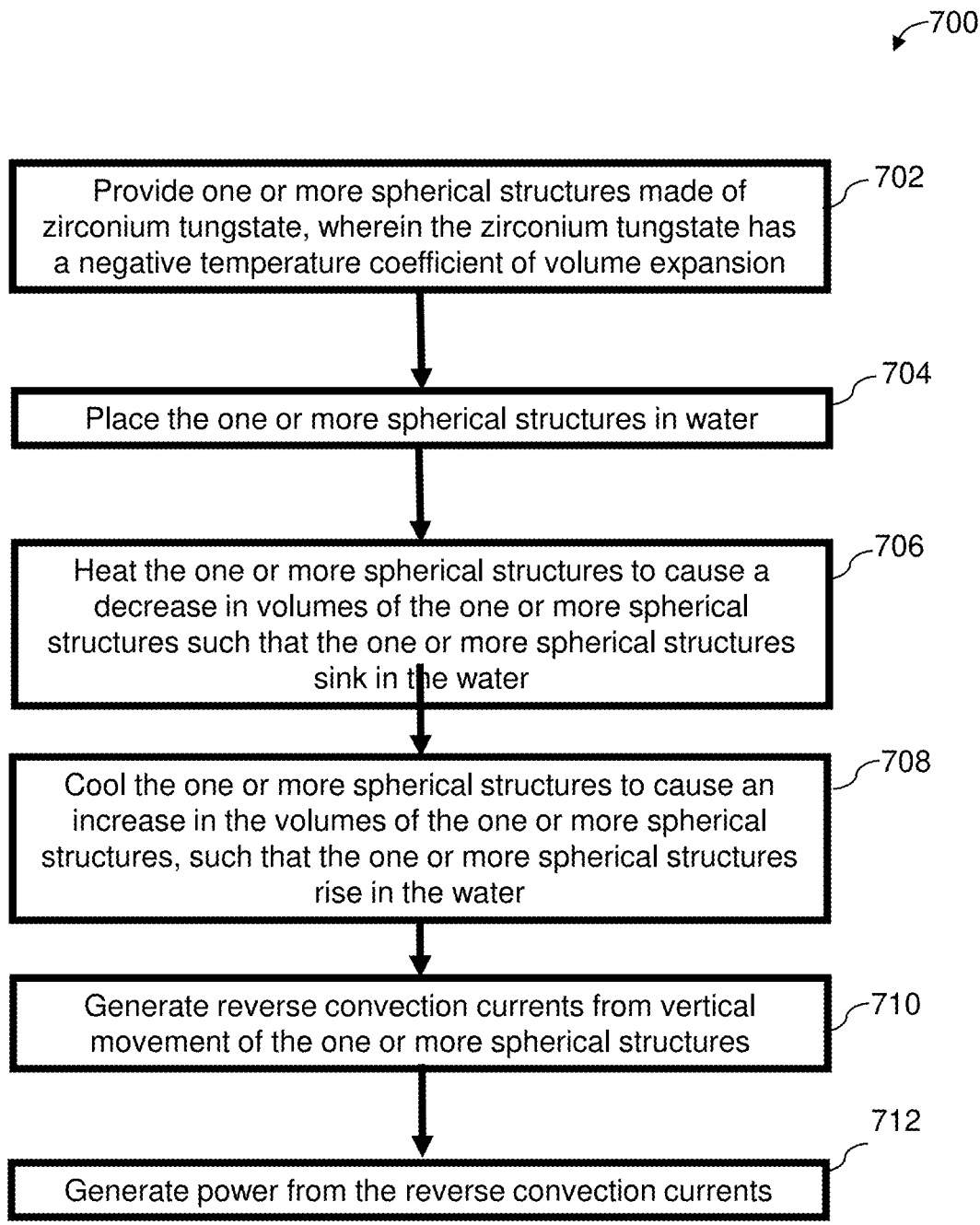
FIG. 7 includes a flow chart of an example power generation method using zirconium tungstate spheres in the systems described herein.

FIG. 7 illustrates a flowchart of an example method 700 of generation power. The method 700 may be arranged with at least one embodiment described in the present disclosure. In these and other embodiments, one or more of the steps or none of the steps of the method 700 may be performed based on the execution of instructions stored on one or more non-transitory computer-readable media. Although illustrated as discrete blocks, various blocks may be divided into additional blocks, combined into fewer blocks or eliminated, depending on the desired implementation. Also, any operation of the present invention or functionality thereof can be controlled by computer-executable instructions, which can be performed by a computing system 600 as described herein. Thus, the operation of the system for generating electricity can be optimized by computer control.

The method may begin at block 702, where one or more spherical structures made of zirconium tungstate may be provided. In some embodiments, the zirconium tungstate spheres may have a negative temperature coefficient of volume expansion. At block 704, the one or more spherical structures may be in placed in water or other convection fluid. For example, the one or more spherical structures may be placed in the housing structure, which can be located in an ocean or a lake.

At block 706, the spherical structures may be heated. In some embodiments, volumes of the spherical structures may decrease in response to being heated such that the spherical structures sink in the water or other convection fluid.

At block 708, the spherical structures may be cooled. In some embodiments, the volumes of the spherical structures may increase, such that the spherical structures rise in the water or other convection fluid.

At block 710, reverse convection currents may be generated from vertical movement of the spherical structures, where the spherical structures shrink as a temperature of the spherical structures increases and spherical structures expand as the temperature of the spherical structures decreases.

At block 712, electrical power may be generated from the reverse convection currents. In some embodiments, the electrical power may be generated by a turbine and a power generator. The turbine may be configured to rotate following the reverse convection cycles of the spheres and/or reverse convection currents of the convection fluid. The power generator may be configured to generate power from the rotating of the turbine.

It is understood that, for this and other process, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 8:
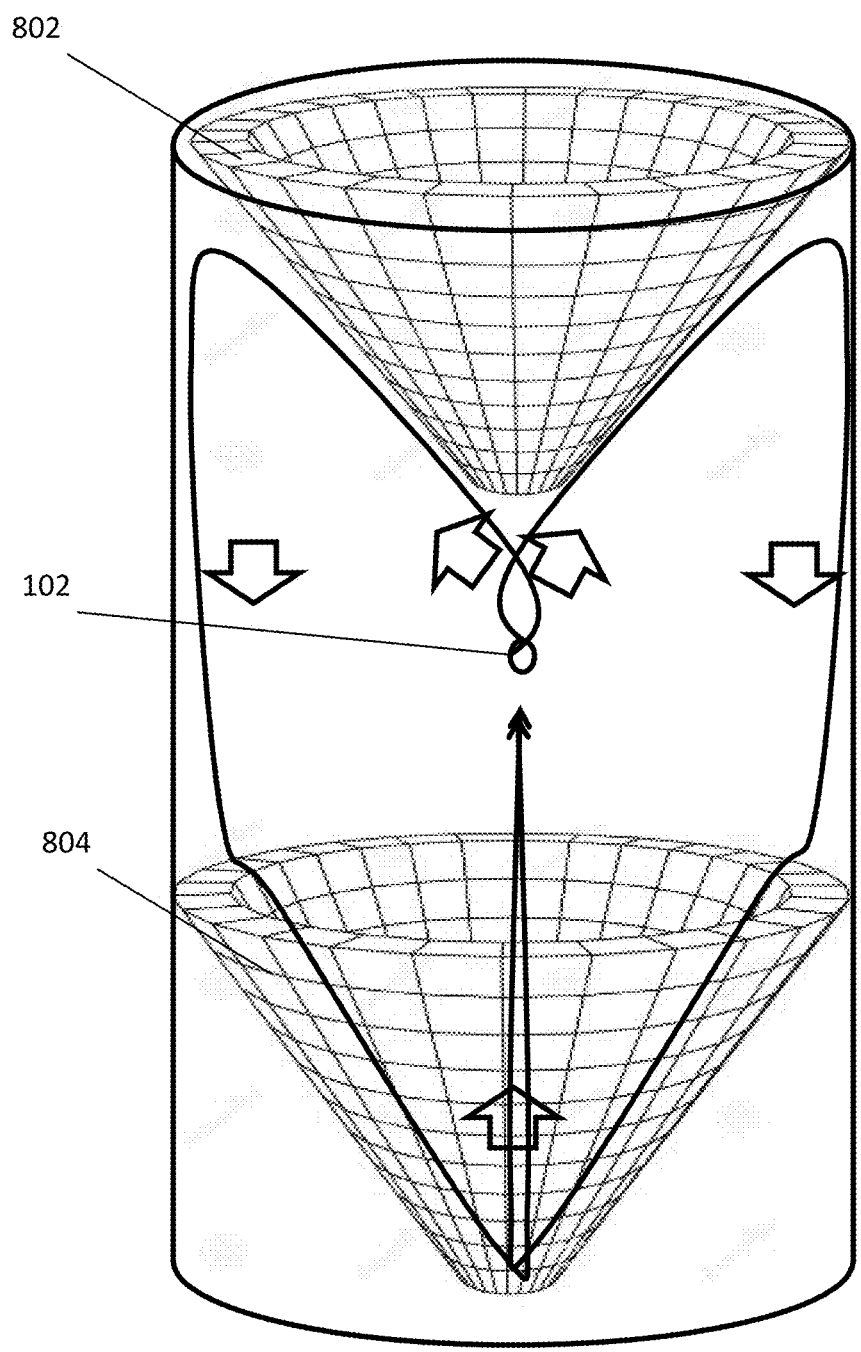
FIG. 8 shows an embodiment of the housing structure containing conical structures that are porous, mesh or otherwise open to allow fluid to pass therethrough while directing horizontal movement as the zirconium tungstate structures rise or sink.

FIG. 8 shows an embodiment of the housing structure containing conical structures 802,804 that are porous, mesh or otherwise open to allow fluid to pass therethrough while directing horizontal movement as the zirconium tungstate structures rise or sink. The arrows show a flow path, which shows the zirconium tungstate structure 102 rise and be pushed outward by the top conical structure 802 and then sink to be pushed inwardly by the bottom conical structure 804. This can facilitate a reverse convection cycle or current.

Figure 9:
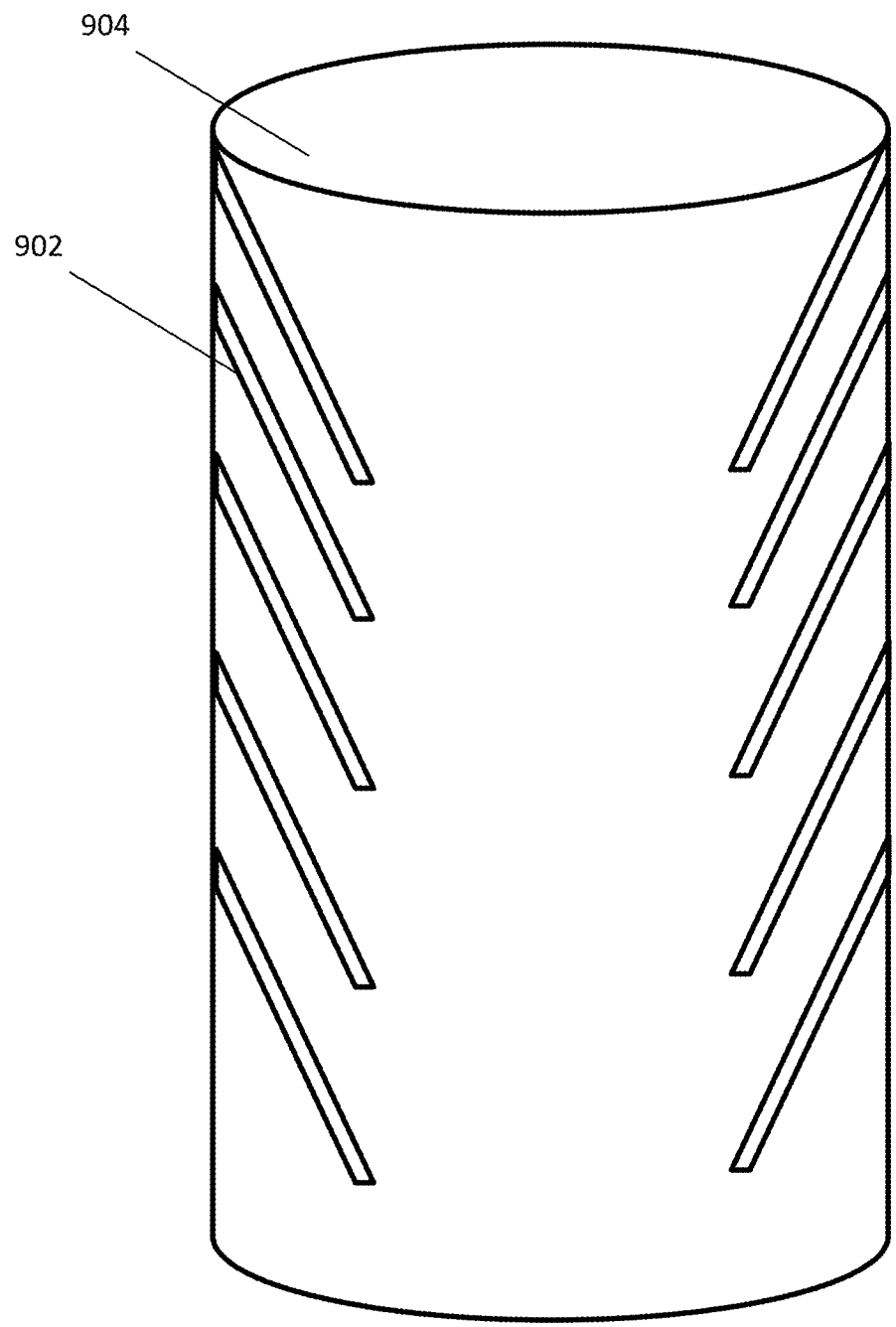
FIG. 9 shows the housing structure containing angled arms that are angled downward and inward or upward and outward, or vice versa.

FIG. 9 shows the housing structure 904 containing angled arms 902 that are angled downward and inward or upward and outward, or vice versa. The angled arms 902 can direct the direction of movement outward when the zirconium tungstate structures rise, and inward when the zirconium tungstate structures sink. This structure can facilitate a reverse convection cycle or current. Also, the arms 902 can be located all around the circumference of the inside of the housing structure as well as from the bottom to the top. Different arm sizes can also be used. Nevertheless, the arms 902 can facilitate a cycle from the zirconium tungstate structures.

Figure 10:
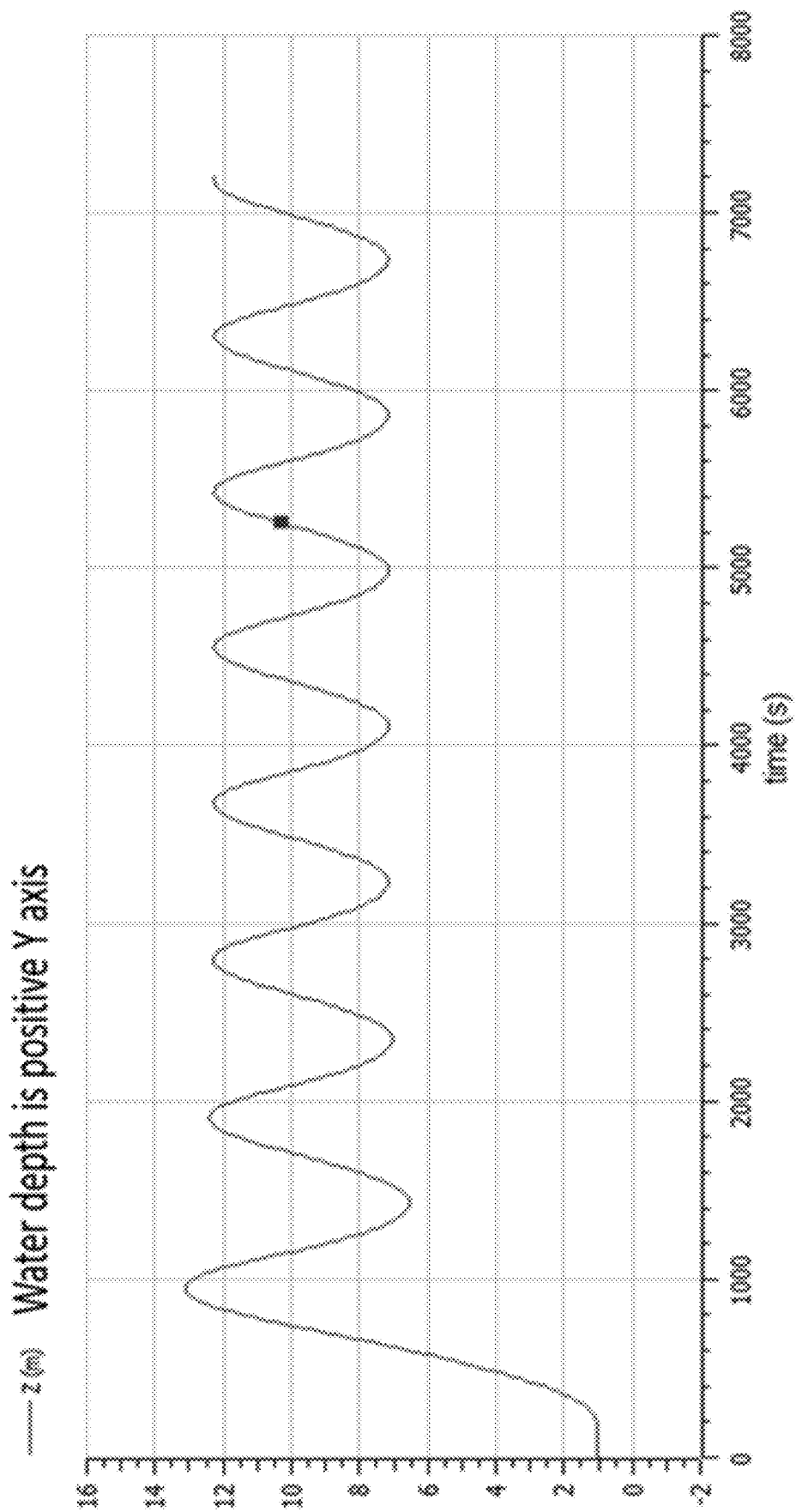
FIG. 10 shows an example oscillation plot of the zirconium tungstate spheres in a water thermocline over time.

FIG. 10 shows an example oscillation plot of the zirconium tungstate spheres in a water thermocline over time. The plot is for zirconium tungstate spheres with 30 cm (12 inch) diameter, and having a wall thickness of 2.2 cm. The models analytically show reverse convection with a frequency of about 1000 seconds.

EMBODIMENTS

In some embodiments, a method of power generation can include: providing one or more structures made of a material having a negative thermal expansion coefficient (NTEC structures); placing the one or more of the one or more NTEC structures in a convection fluid; heating the one or more NTEC structures to cause a decrease in volume of the one or more NTEC structures such that the one or more NTEC structures sink in the convection fluid; cooling the one or more NTEC structures to cause an increase in the volume of the one or more NTEC structures such that the one or more NTEC structures rise in the convection fluid; generating a reverse convection cycle in the convection fluid with the one or more NTEC structures, wherein the one or more NTEC structures sink after the one or more NTEC structures increases in temperature past an upper temperature threshold and rise after the one or more NTEC structures decreases in temperature past a lower temperature threshold; and generating power from the reverse convection cycle.

In some embodiments, the NTEC structures are formed of zirconium tungstate, $AM_2O_8$, $HfV_2O_7$, $ZRV_2O_7$, titanium alloy (e.g., ALLVAR Alloy 30), carbon fibers, quartz, zeolite, scandium trifluoride, and combinations thereof, wherein A is Zr or Hf, and M is Mo or W.

In some embodiments, a method of power generation can include: providing one or more hybrid buoyant structures made of zirconium tungstate, wherein the zirconium tungstate has a negative temperature coefficient of volume expansion such that the hybrid buoyant structure is capable of buoyancy at a first temperature range and capable of sinking at a second temperature range, wherein the first temperature range is lower than the second temperature range; placing the one or more hybrid buoyant structures in a convection fluid; heating the one or more hybrid buoyant structures to cause a decrease in volume of the one or more hybrid buoyant structures such that the one or more hybrid buoyant structures sink in the convection fluid; cooling the one or more hybrid buoyant structures to cause an increase in the volume of the one or more hybrid buoyant structures such that the one or more hybrid buoyant structures rise in the convection fluid; generating a reverse convection current in the convection fluid from vertical movement of the one or more hybrid buoyant structures, wherein the one or more hybrid buoyant structures sink after the one or more hybrid buoyant structures increases in temperature past an upper temperature threshold of the second temperature range and rise after the one or more hybrid buoyant structures decreases in temperature past a lower temperature threshold of the first temperature range; and generating power from the reverse convection currents.

In some embodiments, a method of power generation can include: providing one or more structures made of zirconium tungstate; placing the one or more zirconium tungstate structures in a convection fluid; heating the one or more zirconium tungstate structures to cause a decrease in volume of the one or more zirconium tungstate structures such that the one or more zirconium tungstate structures sink in the convection fluid; cooling the one or more zirconium tungstate structures to cause an increase in the volume of the one or more zirconium tungstate structures such that the one or more zirconium tungstate structures rise in the convection fluid; generating a reverse convection cycle with the one or more zirconium tungstate structures, wherein the one or more zirconium tungstate structures sink after the one or more zirconium tungstate structures increases in temperature past an upper temperature threshold and rise after the one or more zirconium tungstate structures decreases in temperature past a lower temperature threshold; and generating power from the reverse convection cycle.

In some embodiments, the zirconium tungstate structures may be housed in a housing structure configured to entrap the reverse convection cycle generated by the zirconium tungstate structures.

In some embodiments, the zirconium tungstate structures may be housed in a housing structure configured to retain the reverse convection current cycle generated by the zirconium tungstate structures.

In some embodiments, the housing structure may be placed at least partially submerged in a body of water.

In some embodiments, the housing structure may be placed at least partially submerged in a thermal fluid having a thermocline, wherein the thermal fluid is configured to retain the housing structure and provide a vertical temperature profile to the housing structure.

In some embodiments, the housing structure may be placed fully submerged in the water or the thermal fluid.

In some embodiments, the temperature of an upper region of the convection fluid and/or the zirconium tungstate structures therein may increase due to heat from direct sunlight to the confection fluid, zirconium tungstate structures, and/or upper region of the housing structure.

In some embodiments, the temperature of the zirconium tungstate structures may increase and volume of the zirconium tungstate structures decrease as the zirconium tungstate structures rise due to a thermocline of the convection fluid.

In some embodiments, the temperature of the zirconium tungstate structures may decrease and volume of the zirconium tungstate structures increase as the zirconium tungstate structure contacts with cooler lower layers of the convection fluid.

In some embodiments, the power may be generated by a turbine configured to rotate following the reverse convection cycle of the zirconium tungstate structures or reverse convection currents of the convection fluid and a power generator configured to generate power from mechanical rotation of the turbine.

In some embodiments, a reverse convection power generation device can include: one or more spherical structures that are made primarily of zirconium tungstate, which one or more spherical structures are configured to move vertically while submerged in water or other convection fluid having a vertical temperature gradient, wherein each of the spherical structures decrease in volume and sink in response to being heated past an upper temperature threshold, and increase in volume and rise in response to being cooled past a lower temperature threshold; a turbine configured to rotate in response to vertical movement of the one or more spherical structures; a power generator configured to generate power from rotating of the turbine; a housing structure containing the one or more spherical structures and the turbine, and being configured to be placed in a thermocline fluid; and one or more floating devices attached to the housing structure, wherein the one or more floating devices are configured to control a depth of the housing structure at least partially submerged in the thermocline fluid.

In some embodiments, a reverse convection power generation system can include: one or more zirconium tungstate structures that are configured to decrease in volume when being heated and increase in volume when being cooled; a turbine configured to rotate in response to vertical movement of the zirconium tungstate structures; a power generator configured to generate power from rotation of the turbine; a housing structure configured to house the zirconium tungstate structure and the turbine in a convection fluid, wherein the housing structure is adapted to be located in a body of water; and one or more structural members configured to be attached to the housing structure, wherein the one or more structural members may control a position the housing structure so as to be at least partially submerged in the body water.

In some embodiments, a reverse convection power generation system can include: one or more zirconium tungstate structures that are configured to decrease in volume when being heated and increase in volume when being cooled; a turbine configured to rotate in response to vertical movement of the one or more zirconium tungstate structures; a power generator configured to generate power from rotation of the turbine; and a housing structure configured to house the one or more zirconium tungstate structure and the turbine in a convection fluid, wherein the housing structure is adapted to be located in a body of water.

In some embodiments, a reverse convection power generation system can include: one or more zirconium tungstate structures that are configured to decrease in volume when being heated and increase in volume when being cooled; and a housing structure configured to house the one or more zirconium tungstate structure, wherein the housing structure is adapted to be located in a body of water.

In some embodiments, a reverse convection power generation system can include: one or more zirconium tungstate structures that are configured to decrease in volume when being heated and increase in volume when being cooled; a convection fluid; and a housing structure configured to house the one or more zirconium tungstate structures so as to be at least partially buoyant in the convection fluid, wherein the housing structure is adapted to be located in a fluid having a thermocline.

In some embodiments, the reverse convection power generation device or system can include one or more support structures that are coupled to the power generator and/or housing structure, which one or more support structures are configured to tether the power generator and/or housing structure to floor of the water.

In some embodiments, the reverse convection power generation device or system includes the housing structure that is configured to be fully submerged in water or fluid having the thermocline. The housing structure can be a closed system without exchange of convection fluid and thermocline fluid. Alternatively, the housing structure can be an open system with exchange of convection fluid and thermocline fluid, which may be water.

In some embodiments, the reverse convection power generation device or system can include a housing structure that is configured to be partially submerged in water or fluid having the thermocline, and optionally configured to be moved vertically for increasing or decreasing the submersion of the housing structure.

In some embodiments, the housing structure is composed of a mesh or porous material, or other material that allows water or the thermocline fluid to flow through and interact with the zirconium tungstate structures when at least partially submerged in water or thermocline fluid. Accordingly, the convection fluid can be the thermocline fluid when within the housing structure and contacting the zirconium tungstate structures.

In some embodiments, the housing structure is solid such that the convection fluid does not mix with the thermocline fluid.

In some embodiments, the housing structure may include a heat-exposed portion or a light-exposed portion. In some aspects, the light-exposed portion of the housing structure may be composed of material transparent to light. Alternatively, the housing structure can be black. Also, the spheres may be black.

In some embodiments, the heat-exposed portion and/or light-exposed portion of the housing structure includes one or more photovoltaic cell panels, wherein the photovoltaic cell panels may assist in heating the convection fluid, zirconium tungstate structures, and/or housing structure. For example, the one or more photovoltaic cell panels can be coupled to a heater that heats the convection fluid.

In some embodiments, the reverse convection power generation device can include a solar tracking system that is configured to track direction of sunlight and rotate the one or more photovoltaic cell panels to face the sunlight.

In some embodiments, the reverse convection power generation device of can include a tethering structure operably coupled to the housing structure, turbines, and/or power generator, such that the device may be tethered to a floor of the body of water of thermocline fluid by the tethering structure. The tethering structure can be a cable or a support structure that is mounted to the device and floor.

In some embodiments, the reverse convection power generation device or system can include a tether or support structure that includes transmission lines to transport power generated by the power generator.

In some embodiments, the reverse convection power generation system can be configured to perform one or more operations. The one or more operations can include: providing one or more spherical structures made of zirconium tungstate, wherein the zirconium tungstate has a negative temperature coefficient of volume expansion; placing the one or more spherical structures in water; heating the one or more spherical structures to cause a decrease in each of the volumes of the spherical structures such that the one or more spherical structures sink in the water; cooling the spherical structures to cause an increase in the volumes of the one or more spherical structures such that the spherical structures rise in the water; generating reverse convection currents from vertical movement of the one or more spherical structures, wherein the one or more spherical structures sink as a temperature of the one or more spherical structures increases past an upper threshold and rise as the temperature of the one or more spherical structures decreases past a lower threshold; and generating power (e.g., electricity) from the reverse convection currents.

In some embodiments, a system is configured to perform one or more operations, the operations comprising: providing one or more structures made of zirconium tungstate; placing the one or more spherical structures in a thermocline fluid; heating the one or more structures to cause a decrease in volumes of the spherical structures such that the one or more structures sink in the thermocline fluid; cooling the one or more structures to cause an increase in the volume of the one or more structures such that the one or more structures rise in the thermocline fluid; generating reverse convection cycle with the one or more structures, wherein the one or more structures sink after the one or more structures increases in temperature past an upper temperature threshold and rise after the one or more structures decreases in temperature past a lower temperature threshold; and generating power from the reverse convection currents.

In some embodiments, spherical zirconium tungstate objects are provided. The spherical zirconium tungstate objects can be hollow or have a foam or light weight material (floatable) therein. The spherical zirconium tungstate objects can be filled with a porous material or a gas. The spherical zirconium tungstate objects can be filled with a floating material that floats in water.

In some embodiments, a kit can include: zirconium tungstate structures; and a housing structure configured to retain the zirconium tungstate structures therein. Optionally, a convection fluid is included in the housing structure to retain the zirconium tungstate structures.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only and is not intended to be limiting.

In one embodiment, the present methods can include aspects performed on a computing system. As such, the computing system can include a memory device that has the computer-executable instructions for performing the methods. The computer-executable instructions can be part of a computer program product that includes one or more algorithms for performing any of the methods of any of the claims. These methods can include control of the floating devices or mechanical system for movement of the floating devices. Also, the methods can include control of the solar panels for improve directionality. Additionally, the methods can include control of the turbines and power generator for enhanced electricity generation. Moreover, the methods can include routing of the electricity to a power grid or to a battery system, such as depending on the amount of electricity being generated. Additionally, the methods can include controlling the heater to determine the heat potential for warming the convection fluid to a desired temperature, and shutting off the heater when a desired temperature is obtained.

Furthermore, the systems described herein can include thermocouples that measure temperatures throughout the convection fluid, such as at different heights within the housing structure relative to the top. This can allow for monitoring a temperature profile in the housing structure in order to allow for modulations of the system for enhanced or optimized electricity generation.

In one embodiment, any of the operations, processes, or methods, described herein can be performed or cause to be performed in response to execution of computer-readable instructions stored on a computer-readable medium and executable by one or more processors. The computer-readable instructions can be executed by a processor of a wide range of computing systems from desktop computing systems, portable computing systems, tablet computing systems, hand-held computing systems, as well as network elements, and/or any other computing device. The computer readable medium is not transitory. The computer readable medium is a physical medium having the computer-readable instructions stored therein so as to be physically readable from the physical medium by the computer/processor.

There are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The various operations described herein can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a physical signal bearing medium include, but are not limited to, the following: a recordable type medium such as a floppy disk, a hard disk drive (HDD), a compact disc (CD), a digital versatile disc (DVD), a digital tape, a computer memory, or any other physical medium that is not transitory or a transmission.

Examples of physical media having computer-readable instructions omit transitory or transmission type media such as a digital and/or an analog communication medium (e.g., a fiber optic cable, a waveguide, a wired communication link, a wireless communication link, etc.).

It is common to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems, including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. Such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include, but are not limited to: physically mateable and/or physically interacting components and/or wirelessly interactable and/or wirelessly interacting components and/or logically interacting and/or logically interactable components.

Figure 6:
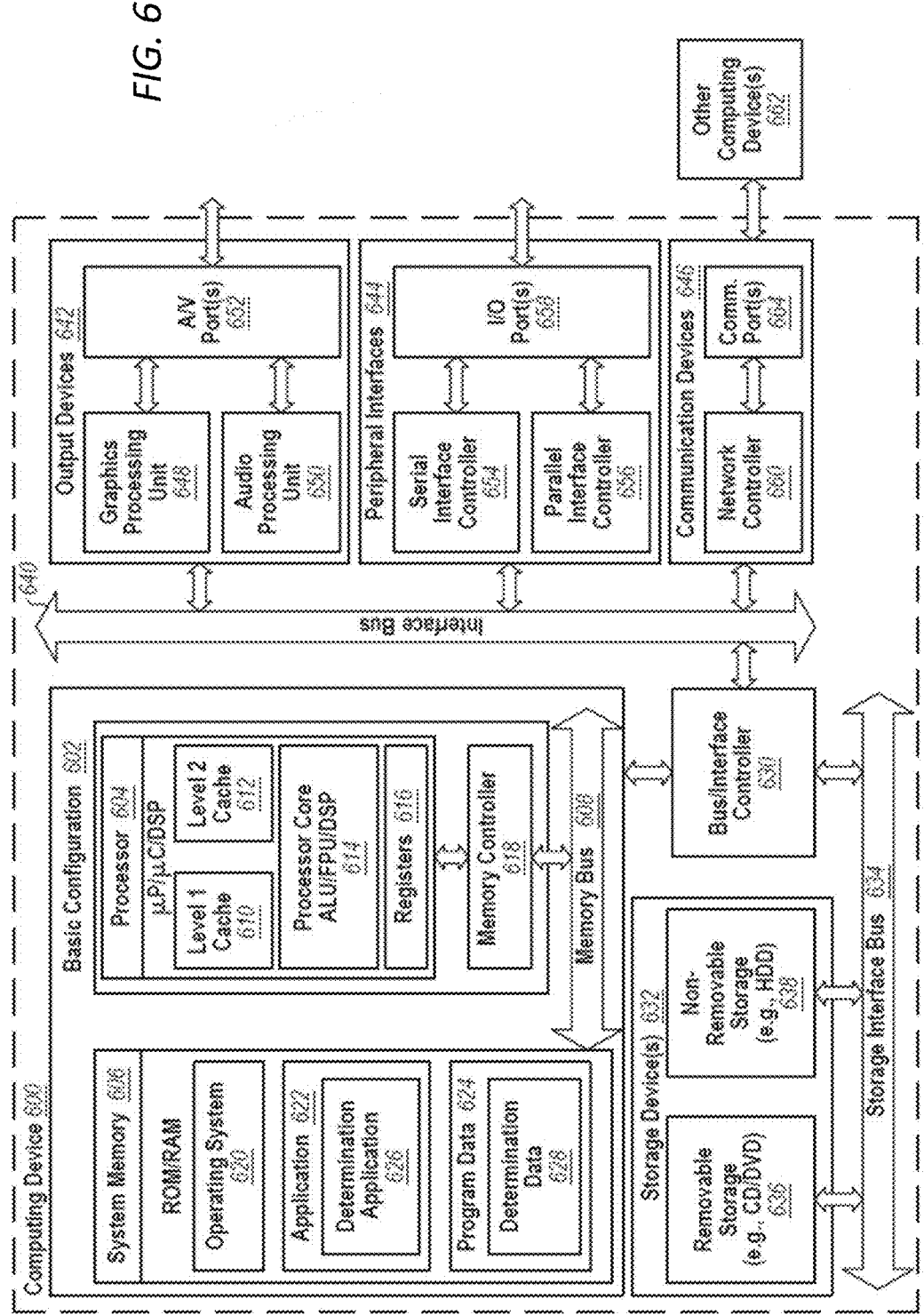
FIG. 6 includes a schematic representation of a computing system that can be used with the systems described herein to perform method steps provided herein.

FIG. 6 shows an example computing device 600 (e.g., a computer) that may be arranged in some embodiments to perform the methods (or portions thereof) described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including, but not limited to: a microprocessor (μP), a microcontroller (μC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including, but not limited to: volatile memory (such as RAM), non-volatile memory (such as ROM, flash memory, etc.), or any combination thereof. System memory 606 may include an operating system 620, one or more applications 622, and program data 624. Application 622 may include a determination application 626 that is arranged to perform the operations as described herein, including those described with respect to methods described herein. The determination application 626 can obtain data, such as pressure, flow rate, and/or temperature, and then determine a change to the system to change the pressure, flow rate, and/or temperature.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include: magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include: volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc.

As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth. From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of power generation, comprising:
   providing one or more structures made of a material having a negative thermal expansion coefficient (NTEC structures);
   placing the one or more of the one or more NTEC structures in a convection fluid;
   heating the one or more NTEC structures to cause a decrease in volume of the one or more NTEC structures such that the one or more NTEC structures sink in the convection fluid;
   cooling the one or more NTEC structures to cause an increase in the volume of the one or more NTEC structures such that the one or more NTEC structures rise in the convection fluid;
       generating a reverse convection cycle in the convection fluid with the one or more NTEC structures, wherein the one or more NTEC structures sink after the one or more NTEC structures increases in temperature past an upper temperature threshold and rise after the one or more NTEC structures decreases in temperature past a lower temperature threshold; and
   generating power from the reverse convection cycle.

2. The method of claim 1, wherein the NTEC structures are spherical.

3. The method of claim 1, wherein the NTEC structures are contained in a housing structure.

4. The method of claim 3, wherein the housing structure is closed to a lateral fluid environment so as to entrap the reverse convection cycles generated by the one or more NTEC structures in the convection fluid.

5. The method of claim 3, wherein the housing structure is open to a lateral fluid environment to allow mixing of the lateral fluid environment and the convection fluid.

6. The method of claim 3, wherein the housing structure is located within a thermocline fluid having a warmer upper temperature and cooler lower temperature.

7. The method of claim 6, wherein the convection fluid and/or thermocline fluid is water.

8. The method of claim 1, further comprising:
   generating the power with at least one turbine that is configured to rotate following the reverse convection cycle of the one or more NTEC structures and/or reverse convection current cycle of the convection fluid; and
   generating electricity with a power generator configured to generate power from mechanical rotating of the turbine.

9. The method of claim 8, comprising providing the electricity to at least one of an electrical power line, electrical power grid, battery system, or electrical device.

10. The method of claim 1, wherein the NTEC is selected from zirconium tungstate, AM2O8, HfV2O7, ZRV2O7, titanium alloy (e.g., ALLVAR Alloy 30), carbon fibers, quartz, zeolite, scandium trifluoride, and combinations thereof, wherein A is Zr or Hf, and M is Mo or W.

11. A reverse convection power generation system, comprising:
    one or more zirconium tungstate structures that are configured to decrease in volume when being heated and increase in volume when being cooled;
    a convection fluid containing the one or more zirconium tungstate structures;
    one or more turbines configured to rotate in response to vertical movement of the one or more zirconium tungstate structures and/or convection fluid;
    a power generator configured to generate power from rotation of the one or more turbines; and
    a housing structure having the one or more zirconium tungstate structures, the convection fluid, and the turbine.

12. The reverse convection power generation system of claim 11, further comprising one or more floatation devices coupled with the housing structure.

13. The reverse convection power generation system of claim 11, further comprising a mechanical system configured for moving the housing structure.

14. The reverse convection power generation system of claim 11, wherein the housing structure includes solid walls.

15. The reverse convection power generation system of claim 11, wherein the housing structure includes porous walls.

16. The reverse convection power generation system of claim 11, further comprising one or more photovoltaic cell panels coupled with an upper region of the housing structure.

17. The reverse convection power generation system of claim 11, further comprising a heater operably coupled with an upper region of the housing structure so as to be configured to heat the convection fluid.

18. The reverse convection power generation system of claim 11, further comprising one or more coupling members that couples the housing structure to another structure or ground.

19. The reverse convection power generation system of claim 11, further comprising an electricity distribution system or an electricity storage system.

* * * * *